United States Patent
Tafoya et al.

(10) Patent No.: US 9,494,751 B2
(45) Date of Patent: Nov. 15, 2016

(54) NON-DESTRUCTIVE DISSIPATION OF EXCESS OPTICAL ENERGY

(71) Applicant: OPTICAL ENGINES, INC., Colorado Springs, CO (US)

(72) Inventors: Jason D. Tafoya, Colorado Springs, CO (US); Donald L. Sipes, Jr., Colorado Springs, CO (US); Daniel Scott Schulz, Colorado Springs, CO (US)

(73) Assignee: OPTICAL ENGINES INC., Colorado Springs, CO (US)

( * ) Notice: Subject to any disclaimer, the term of this patent is extended or adjusted under 35 U.S.C. 154(b) by 0 days.

(21) Appl. No.: 14/158,469

(22) Filed: Jan. 17, 2014

(65) Prior Publication Data

US 2014/0205252 A1    Jul. 24, 2014

Related U.S. Application Data

(60) Provisional application No. 61/754,314, filed on Jan. 18, 2013.

(51) Int. Cl.
*G02B 6/02* (2006.01)
*G02B 6/26* (2006.01)
*G02B 6/42* (2006.01)
*G02B 6/028* (2006.01)
*G02B 6/036* (2006.01)

(52) U.S. Cl.
CPC .......... *G02B 6/4296* (2013.01); *G02B 6/0288* (2013.01); *G02B 6/03627* (2013.01)

(58) Field of Classification Search
CPC .................... G02B 6/4296; G02B 2006/4297
See application file for complete search history.

(56) References Cited

U.S. PATENT DOCUMENTS

| | | | | |
|---|---|---|---|---|
| 5,291,570 A | * | 3/1994 | Filgas | G02B 6/3813 385/78 |
| 5,907,652 A | * | 5/1999 | DiGiovanni et al. | 385/125 |
| 5,946,437 A | * | 8/1999 | Uchida | G02B 6/4296 385/139 |
| 8,542,971 B2 | * | 9/2013 | Chatigny | 385/134 |
| 2009/0092358 A1 | * | 4/2009 | Watanabe et al. | 385/33 |
| 2011/0317967 A1 | * | 12/2011 | Kumkar et al. | 385/98 |

\* cited by examiner

*Primary Examiner* — Omar R Rojas
(74) *Attorney, Agent, or Firm* — Leydig, Voit & Mayer, Ltd.

(57) ABSTRACT

Optical energy in excess of that which is properly coupled into the core of an optical fiber is non-destructively redirected and benignly dissipated so as to minimize damage in a fiber coupled system.

19 Claims, 24 Drawing Sheets

Figure 2(a)
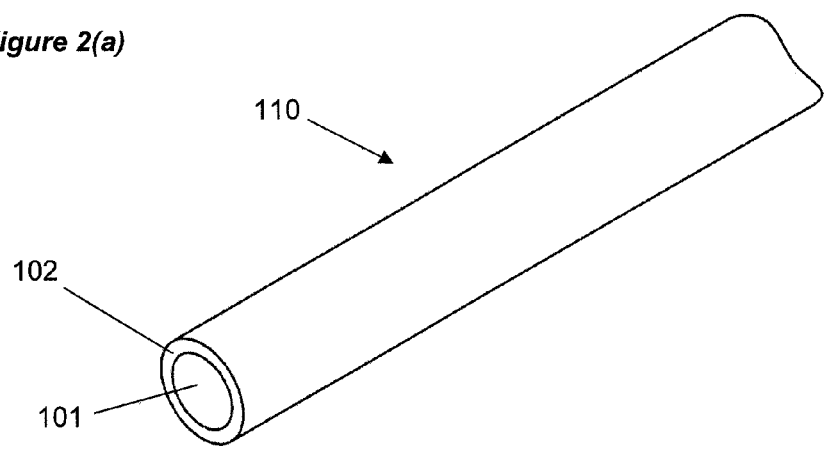
Figure 2(b)
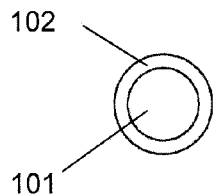
Figure 2(c)
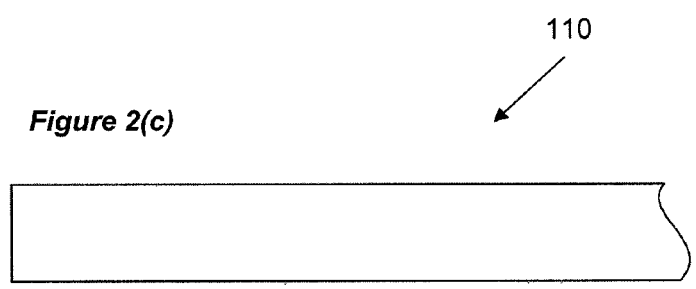
Figure 2(d)
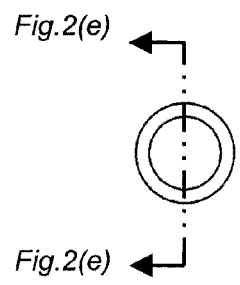
Fig.2(e)
Fig.2(e)
Figure 2(e)
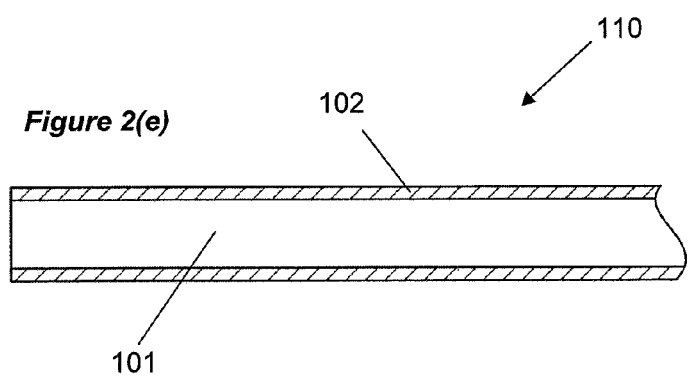

*Figure 3(a)*
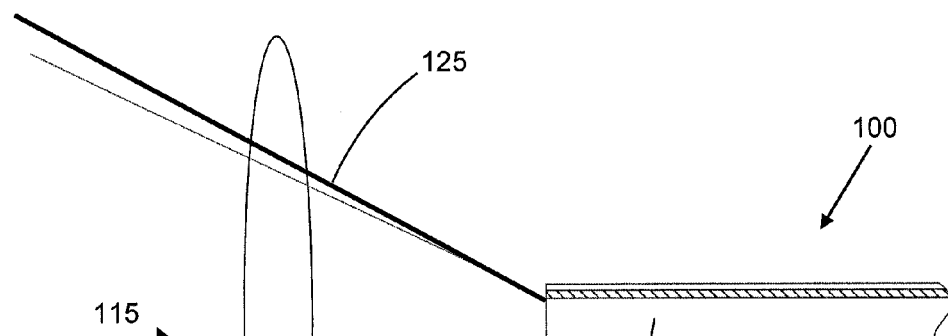
*Figure 3(b)*
*Figure 3(c)*
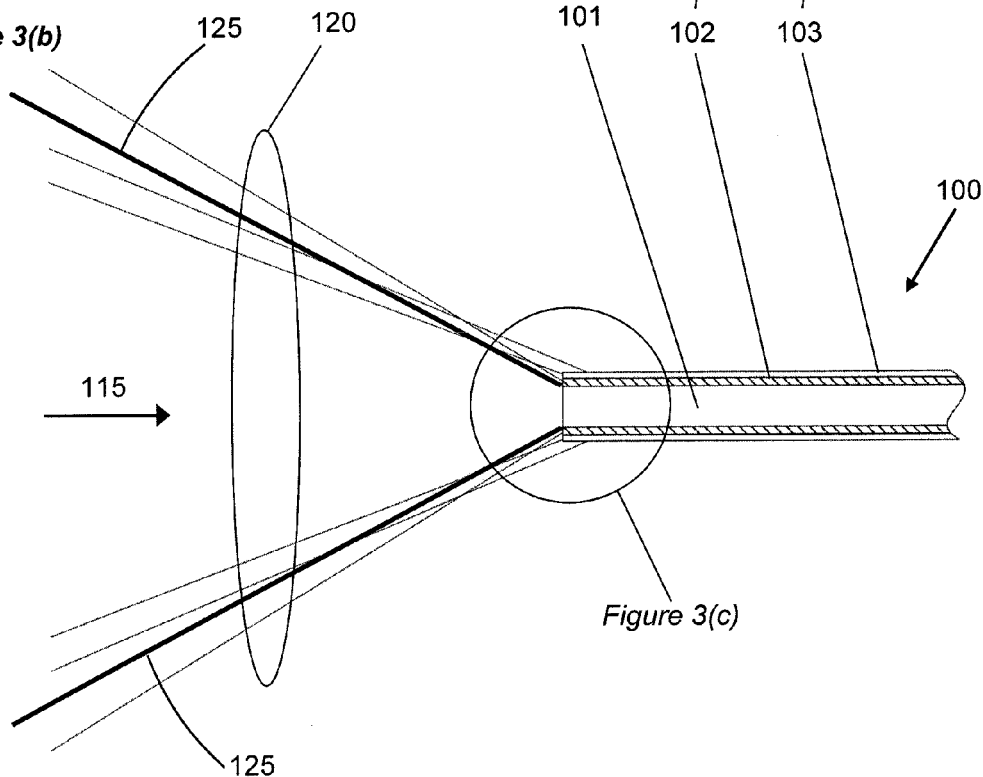

*Figure 4(a)*
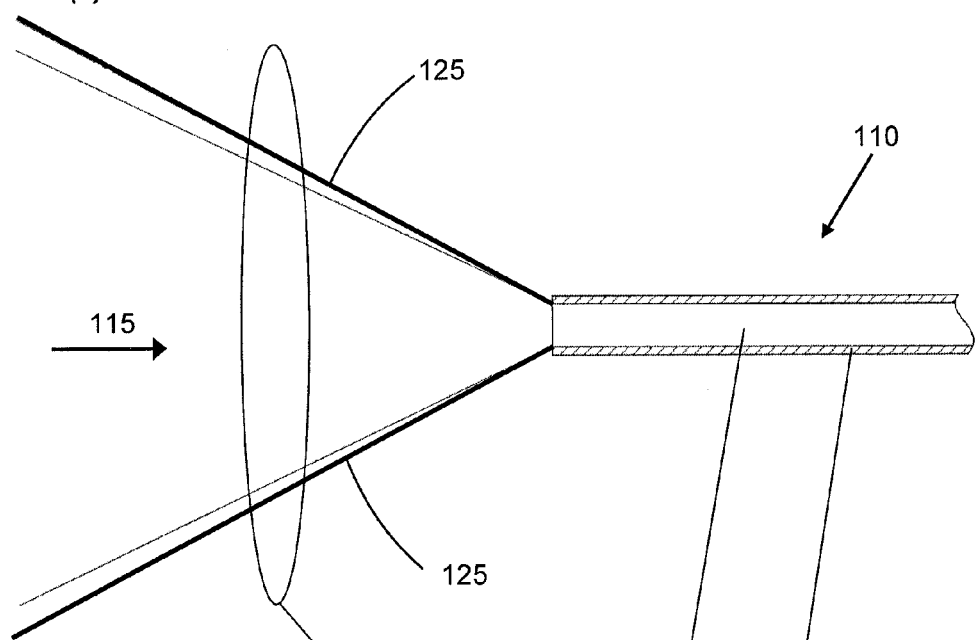
*Figure 4(b)*
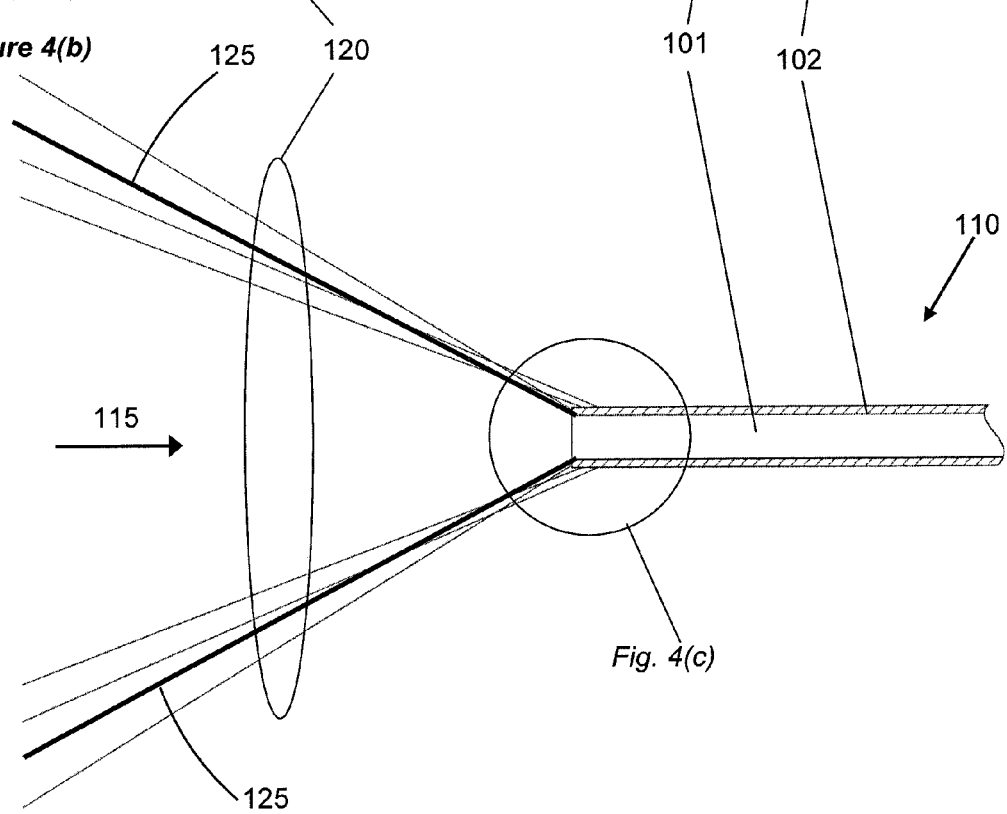
*Fig. 4(c)*

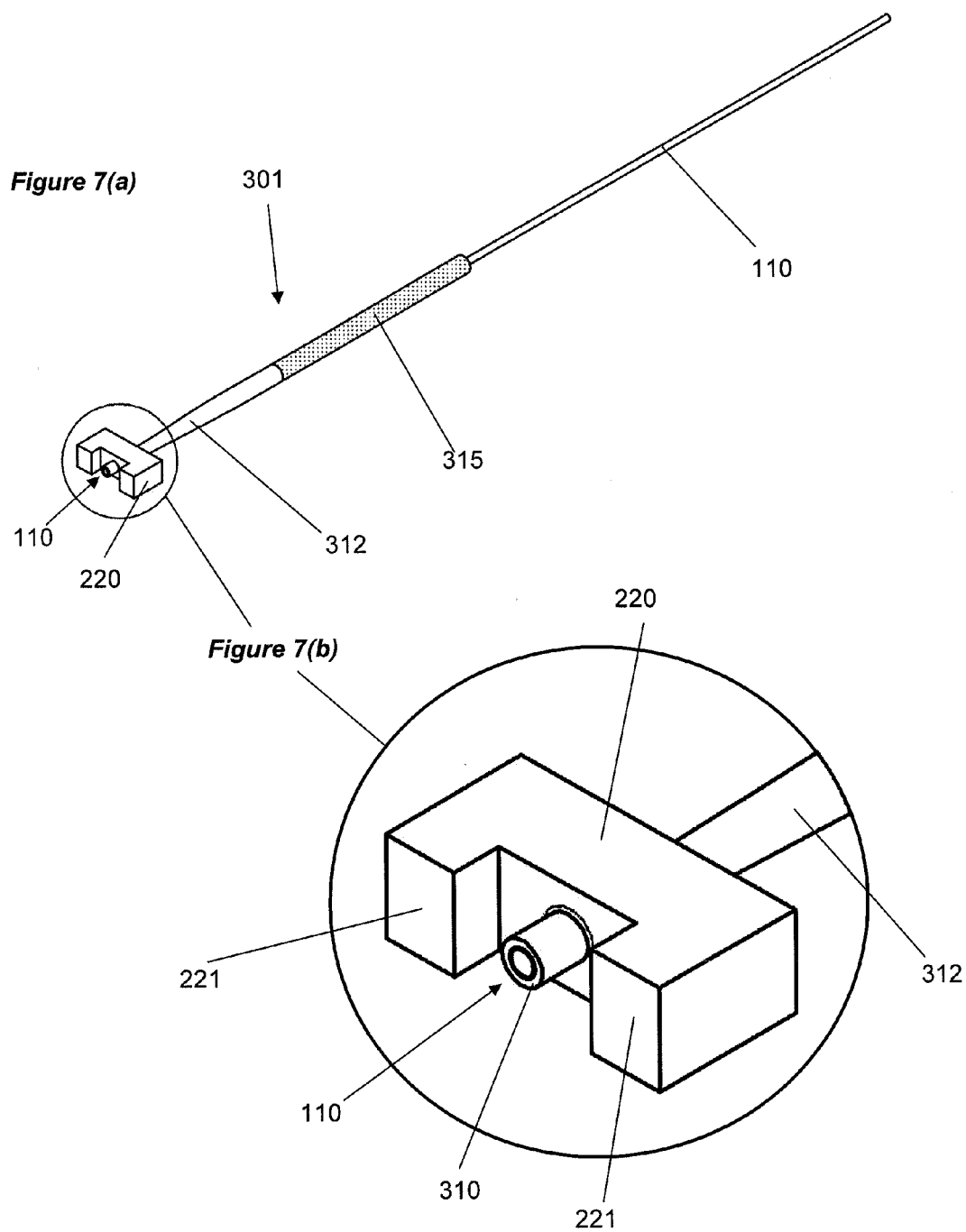

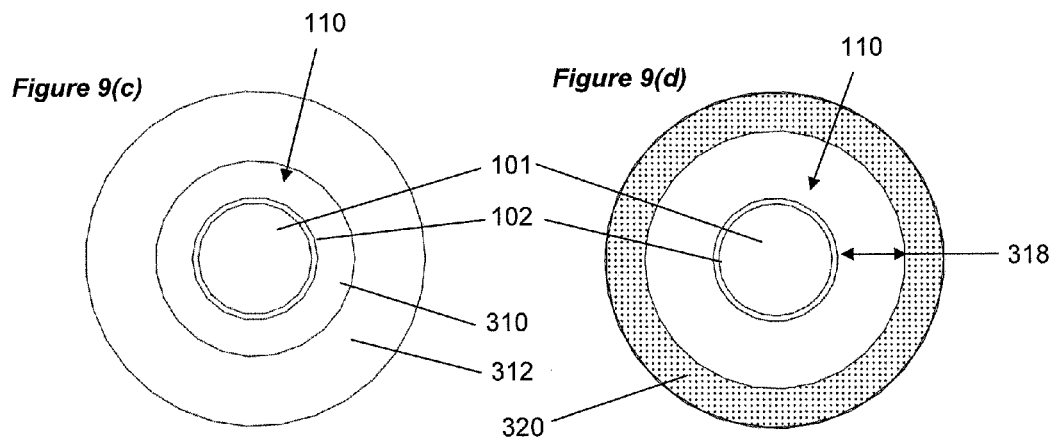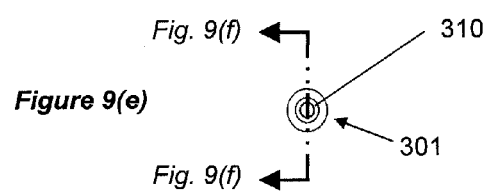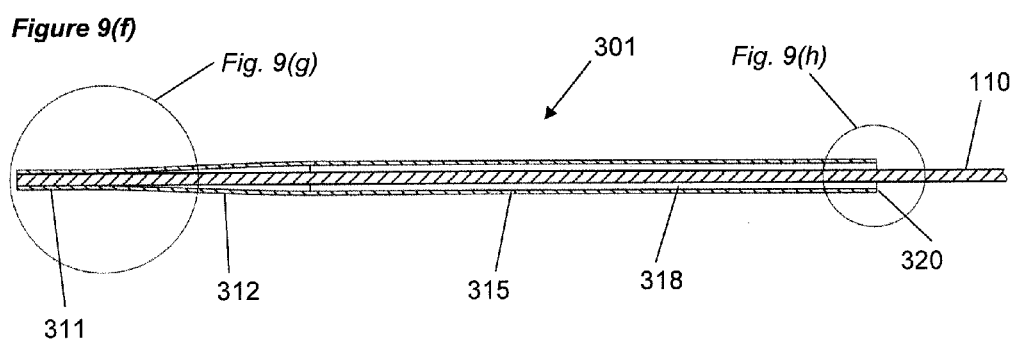

NON-DESTRUCTIVE DISSIPATION OF EXCESS OPTICAL ENERGY

CROSS-REFERENCE TO RELATED APPLICATIONS

This application claims the benefit of U.S. Provisional Application No. 61/754,314, filed on Jan. 18, 2013, which is incorporated by reference in its entirety for all that it teaches.

TECHNICAL FIELD

The present disclosure relates to fiber optics, and more particularly to optical configurations that non-destructively dissipate excess optical energy coupled into optical fiber.

BACKGROUND

Coupling the optical energy of high energy sources of light such as lasers into optical fibers has become increasingly useful in commercial, industrial and military applications. Such coupling allows high optical energy to be readily redirected by optical fiber to where it is needed for its intended usage, whether that is communications, industrial cutting or welding, material processing, or remote destruction of enemy targets. When high optical energy is flexibly guided via optical fiber, it also allows for the combination of multiple sources that may be difficult to combine by other methods.

Optical fiber generally is comprised of a central core, a cladding layer surrounding the core, and often a buffer layer that surrounds and protects the cladding. When light is properly coupled into optical fiber it is directed into the core, which is designed to contain and guide the light along the length of the fiber. However, coupling from high energy sources of light is rarely perfect and some optical energy may stray into the cladding and sometimes into the buffer layer as well. Such stray optical energy, particularly from high energy sources, can cause heating of the optical fiber and other couplings or devices, and can cause significant damage or destruction of the fiber, the couplings or other devices.

In arrangements where there is no buffer layer present at the entrance to the optical fiber but rather is present further down the fiber's length, the stray energy that gets coupled into the cladding will scatter into the buffer layer and may cause damage further along the optical fiber.

SUMMARY

Embodiments of the invention effectively redirect substantial amounts of optical energy out of optical fiber cladding and away from areas around the cladding such that remaining energy is reduced below a damage threshold of the fiber, below the damage threshold of other connected or proximal devices, or both. In other words, embodiments of the invention provide for non-destructively dissipating excess optical energy not coupled into the core of an optical fiber.

Embodiments of the invention utilize optical redirection, optical scattering, optical absorption and controlled thermal dissipation in order to manage high levels of optical energy directed at an optical fiber which may stray and couple into areas other than the core of the optical fiber. In preferred embodiments, such high levels of optical energy originate from high-power laser sources.

Additional features and advantages of the inventive subject matter will be made apparent from the following detailed description of illustrative embodiments that proceeds with reference to the accompanying figures. It should be noted that where cross-hatching appears in the accompanying figures, it is intentionally simplified for clarity of illustration and not intended to be representative of a particular material or materials other than those which are stated herein.

BRIEF DESCRIPTION OF THE DRAWINGS

The inventive subject matter, together with its objects and advantages, may be best understood from the following detailed description taken in conjunction with the accompanying drawings of which:

FIG. 2(a) is a diagram schematically illustrating a perspective view of an exemplary geometry of a single optical fiber without a buffer;

FIG. 2(b) is a diagram schematically illustrating a front view of an exemplary geometry of a single optical fiber without a buffer;

FIG. 2(c) is a diagram schematically illustrating a side view of an exemplary geometry of a single optical fiber without a buffer;

FIG. 2(d) is a diagram schematically illustrating a front view of an exemplary geometry of a single optical fiber without a buffer, including a line indicating a cross-section view;

FIG. 2(e) is a diagram schematically illustrating a cross sectional view of an exemplary geometry of a single optical fiber without a buffer;

FIG. 3(a) is a diagram schematically illustrating a cross sectional view of an exemplary geometry of a single optical fiber with a buffer, such as that shown in FIG. 1(e), along with optical energy converging on the core;

FIG. 3(b) is a diagram schematically illustrating a cross sectional view of an exemplary geometry of a single optical fiber with a buffer, such as that shown in FIG. 1(e), along with optical energy converging on and beyond the core;

FIG. 4(a) is a diagram schematically illustrating a cross sectional view of an exemplary geometry of a single optical fiber without a buffer, such as that shown in FIG. 2(e), along with optical energy converging on the core;

FIG. 4(b) is a diagram schematically illustrating a cross sectional view of an exemplary geometry of a single optical fiber without a buffer, such as that shown in FIG. 2(e), along with optical energy converging on and beyond the core;

FIG. 7(a) is a diagram schematically illustrating a perspective view of an exemplary embodiment of an optical fiber energy scattering sub-assembly;

FIG. 7(b) is a diagram schematically illustrating a detail view of the exemplary embodiment of a mounting block of the optical fiber energy scattering sub-assembly shown in FIG. 7(a);

FIG. 9(c) is a diagram schematically illustrating an enlarged end view of the exemplary embodiment of an optical fiber energy scattering sub-assembly shown in FIG. 9(a), showing the entrance end;

FIG. 9(d) is a diagram schematically illustrating an enlarged end view of the exemplary embodiment of an optical fiber energy scattering sub-assembly shown in FIG. 9(a), showing the end opposite the entrance end;

FIG. 9(e) is a diagram schematically illustrating a non-enlarged end view of the exemplary embodiment of an optical fiber energy scattering sub-assembly shown in FIG. 9(a), showing the entrance end and a cross-section view line;

FIG. 9(f) is a diagram schematically illustrating a cross-section view of the exemplary embodiment of an optical fiber energy scattering sub-assembly shown in FIG. 9(b);

DETAILED DESCRIPTION

Figure 1A:
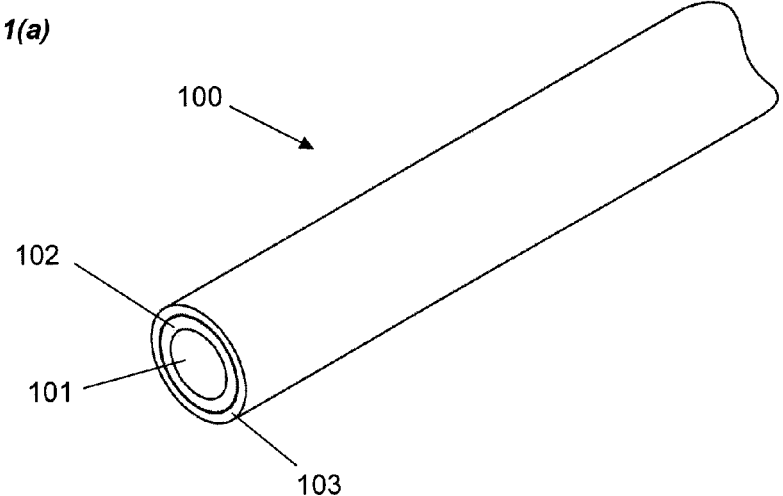
FIG. 1(a) is a diagram schematically illustrating a perspective view of an exemplary geometry of a single optical fiber with a buffer.
Figure 1B:
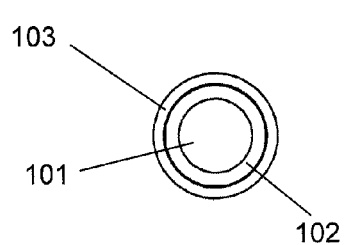
FIG. 1(b) is a diagram schematically illustrating a front view of an exemplary geometry of a single optical fiber with a buffer.
Figure 1C:
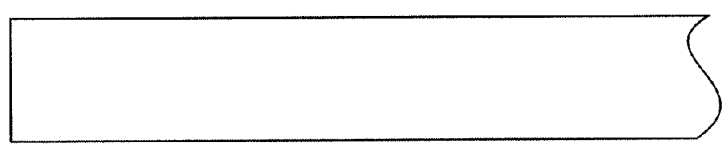
FIG. 1(c) is a diagram schematically illustrating a side view of an exemplary geometry of a single optical fiber with a buffer.
Figure 1D:
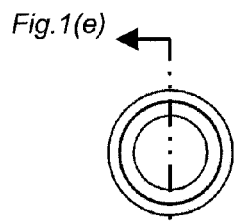
FIG. 1(d) is a diagram schematically illustrating a front view of an exemplary geometry of a single optical fiber with a buffer, including a line indicating a cross-section view.
Figure 1E:
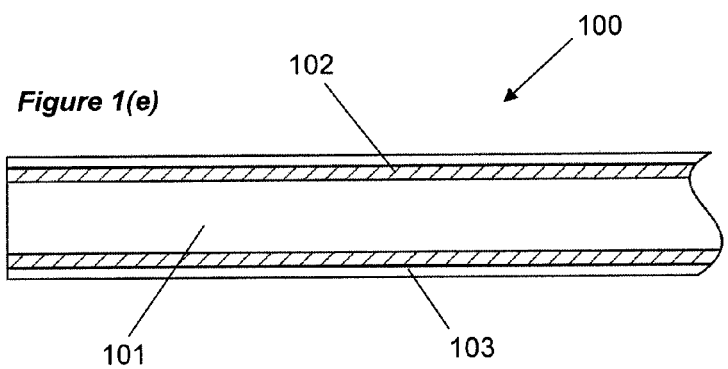
FIG. 1(e) is diagram schematically illustrating a cross sectional view of an exemplary geometry of a single optical fiber with a buffer.

Before the present inventive subject matter is described in further detail, it is to be understood that the inventive subject matter is not limited to the particular embodiments described, as such may, of course, vary. Turning now to the drawings, prior to describing the systems and methods of the inventive subject matter, the structure of exemplary optical fibers and their application as conduits of optical energy is first described in order to facilitate an understanding and appreciation of the approach of the inventive subject matter. As explained below, embodiments of the invention provide for non-destructively dissipating the excess energy of the output beam or beams from high-power lasers that have strayed beyond the core of an optical fiber, thereby preventing damage to the fiber, the cladding, the buffer or other components or devices connected to or proximally arranged near the optical fiber or otherwise in the path of the concentrated or coherent optical energy in use. Nevertheless, the present inventive subject matter is not limited to a laser or lasers as the source of optical energy, and can be applied to other forms of optical energy sources such as focused solar energy, and including those sources of optical energy that may be developed in the future. Nor is the inventive subject matter limited to multimode optical fiber, which is a preferred embodiment.

It is to be understood that in the accompanying drawings, diagrams and illustrations, optical energy may be depicted as "beams" of light or as "rays" of optical energy in order to illustrate the operating principles of this inventive subject matter. The angles, directions, trajectories, deflections, refractions, reflections and other alterations to the paths of the beams of optical energy or rays of optical energy as portrayed in the drawings, diagrams and illustrations below are meant to be illustrative of the principles involved and may not be exact representations of each and every possible path a given beam or ray of optical energy may take or even of any given ray. For the sake of clarity, only a minimal number of depictions of such "beams" or "rays" of optical energy may be illustrated. It is also to be understood that references to "optical energy" refer to electromagnetic energy having a wavelength at which the optical fiber being used is sufficiently transparent for the application to which the overall system is to be used.

It should be noted that reference may be made to an entire group or collection of figures by making use of only the figure's number and not the letter following the number, i.e. if there is FIG. 99(a), FIG. 99(b) and FIG. 99(c), then referring to "FIG. 99" would include all three, (a), (b) and (c).

A diagram schematically illustrating an example of a typical structure of a multimode optical fiber with a buffer is shown in FIG. 1(a) through FIG. 1(e). In this example, the multimode optical fiber 100 comprises a core 101, cladding 102 and a buffer 103. The core 101 is the intended path through which optical energy is to be guided, while the cladding 102 surrounds the core 101 with a material of lower refractive index in order to reflect optical energy back into the core 101 and guide that energy along the length of the fiber 100. The buffer 103 surrounds the cladding 102 and protects the cladding 102 against damage that might reduce its optical effectiveness.

A diagram schematically illustrating an example of a typical structure of a multimode optical fiber 110 without a buffer is shown in FIG. 2(a) through FIG. 2(e). In this example, the multimode optical fiber 110 comprises a core 101 and cladding 102, each of which functions as described previously, but does not comprise a buffer.

In another example, an optical fiber may comprise an initial length without a buffer and a further length with a buffer.

Figure 2F:
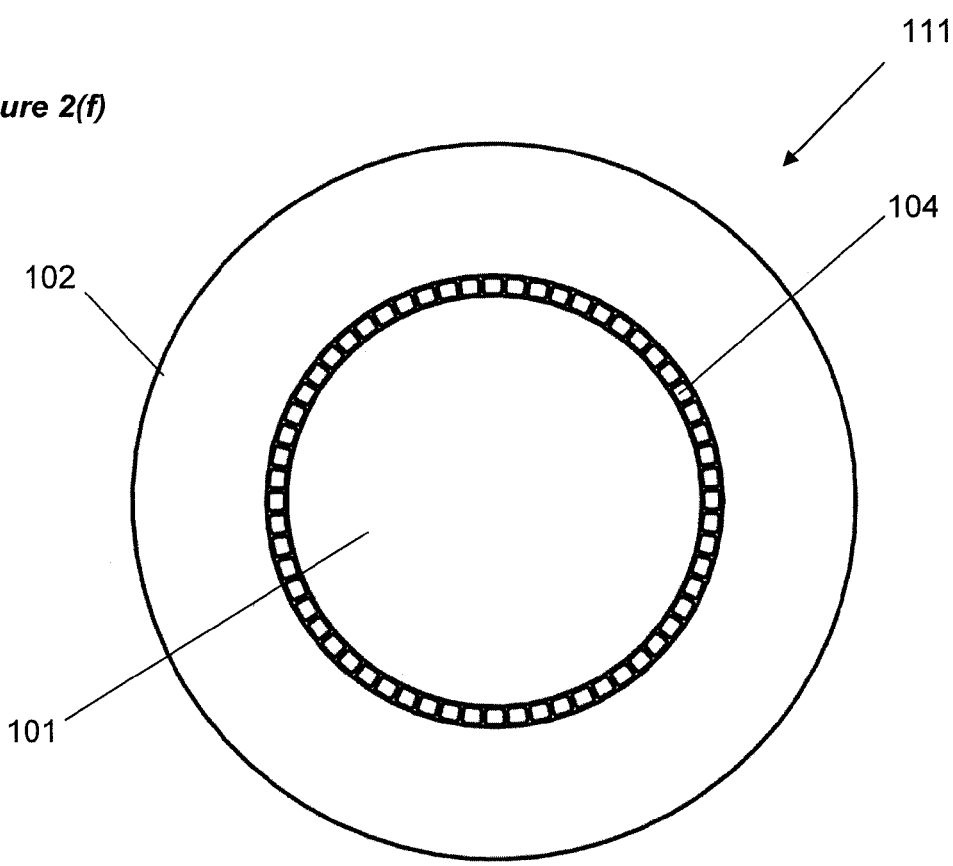
FIG. 2(f) is a diagram schematically illustrating a front view of an exemplary geometry of a single air-clad optical fiber without a buffer.
Figure 2G:
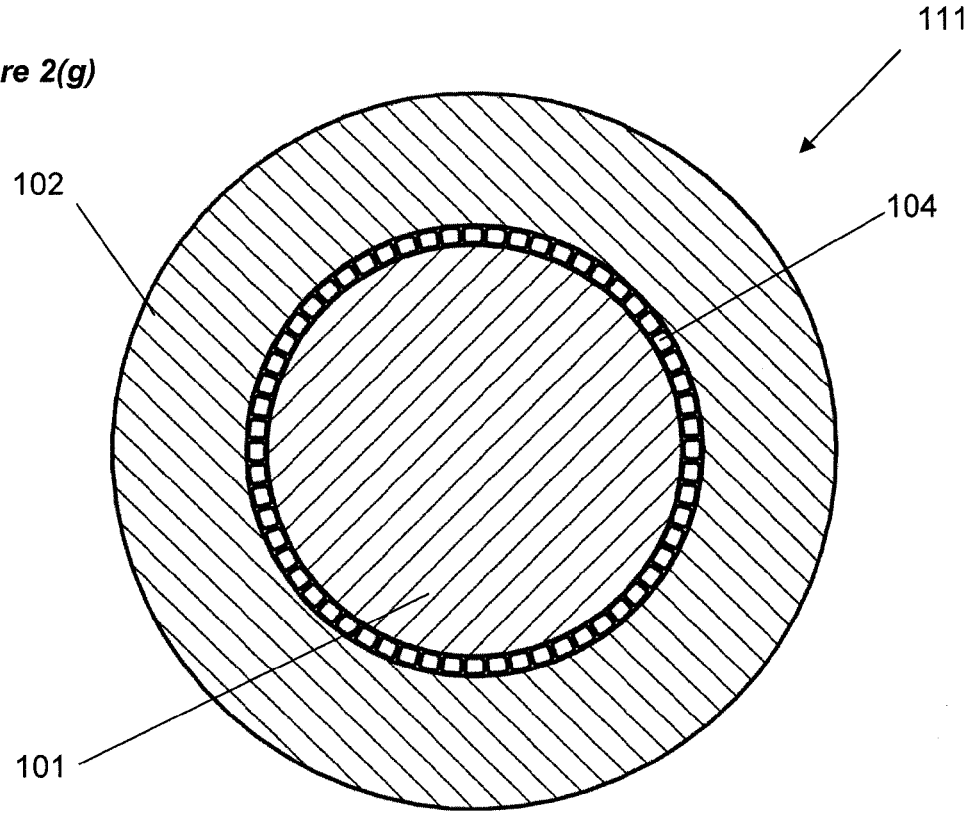
FIG. 2(g) is a diagram schematically illustrating a front view of an exemplary geometry of a single air-clad optical fiber without a buffer, with cross-hatching used to indicate solid areas.

Another example of an optical fiber without a buffer is illustrated schematically in FIG. 2(f). The optical fiber 111 is an air-clad optical fiber comprising a core 101, an air cladding 104 and an outer cladding 102. A diagram schematically illustrating the air-clad optical fiber of FIG. 2(f) is shown in FIG. 2(g) using cross-hatching to indicate solid areas.

Various embodiments of the present inventive subject matter are particularly well-suited to applications where air-clad fibers are used because the optical energy which ends up in the solid outer cladding 102 tends to be less able to escape such cladding compared to an optical fiber in which the core and the cladding are both essentially solid, due to the greater differences in refractive index of air versus that of typical core materials. However, it will be appreciated that embodiments of the inventive subject matter enable non-destructive dissipation of excess energy for many different types of optical fibers, including those with a solid outermost cladding layer, as well as fibers having other core construction, materials and arrangements which differ from the exemplary embodiments shown herein.

The following embodiments of the invention will be discussed with reference to an optical fiber 100 with cladding and an optical fiber 110 without cladding as previously described herein.

The efficient coupling of light into a multimode optical fiber 100 is constrained by the angular acceptance cone 125 of the fiber which is conventionally defined in terms of the diameter of the fiber core 101 and the fiber acceptance angle or the "numerical aperture" (NA) of the fiber. The ideal situation, where all beams lie within the angular acceptance cone 125 of the fiber, is illustrated in FIG. 3(a) for an optical fiber 100 with a buffer 103 and in FIG. 4(a) for an optical fiber 110 without a buffer.

Figure 3C:
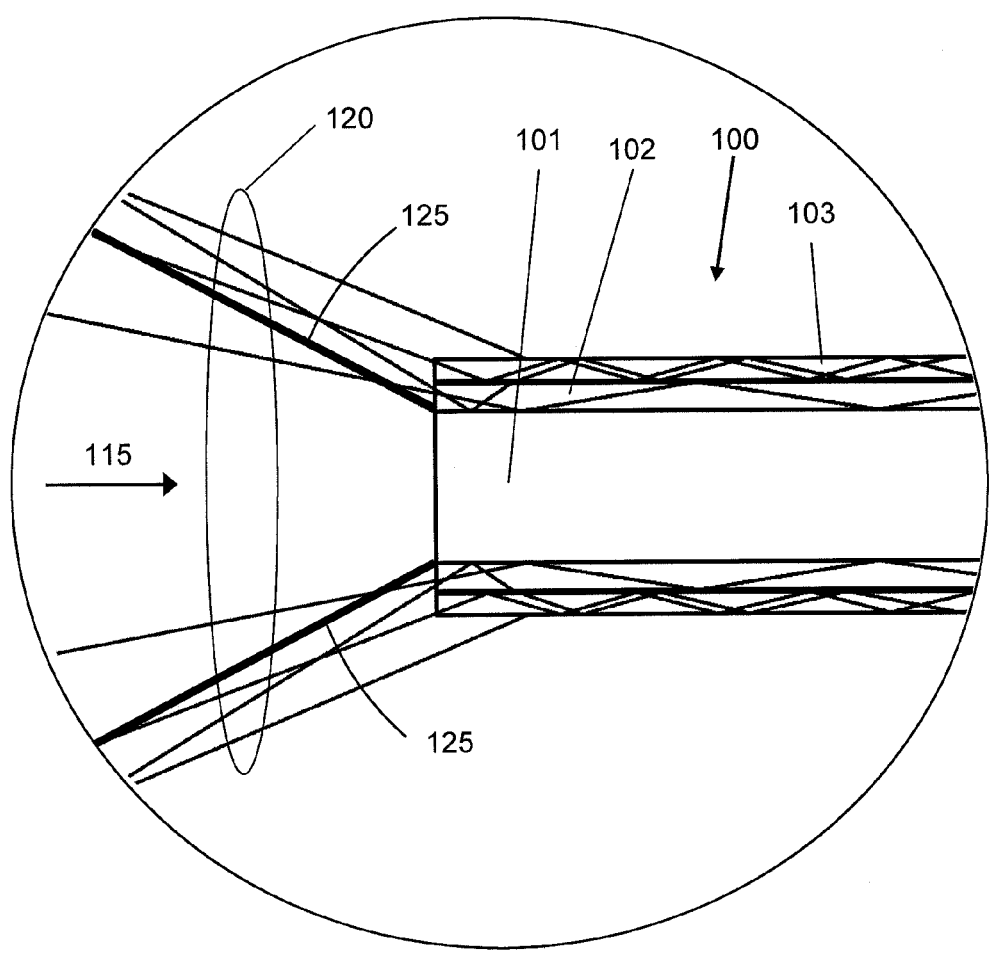
FIG. 3(c) is a diagram schematically illustrating a detail cross sectional view of an exemplary geometry of a single optical fiber with a buffer, such as that shown in FIG. 1(e), along with optical energy converging on and beyond the core.

FIGS. 3(b) and 3(c) illustrate incident light 115 from one or more lasers and/or fibers that is focused into the core 101 of the optical fiber 100 but has a portion that is outside of the angular acceptance cone. In this case, a portion of the light 115 will not be guided through the core of the fiber, but will be instead either be directed into the cladding 102 surrounding the core 101, directed into the buffer 103 surrounding the cladding if such a buffer 103 is present, or scattered into the area surrounding the fiber, potentially impinging upon other components or materials. In many cases, the unmatched portion of the light 115 that is not properly directed into the core 101 (within the core 101 diameter and within the NA of the fiber 100), is likely to damage the cladding 102, the buffer 103, adhesives used in the assembly, and/or even the core 101 due to thermal effects. While optical systems that are designed to couple one or more high beams 120 into the core 101 of optical fiber 100 are generally constructed to do so as efficiently as possible, a portion of the incident light 115 often lies outside of the acceptance cone 125 and is not coupled into the core 101. Therefore, it is of significant benefit to such fiber-coupled systems that the portion of the light 115 that is not coupled into the core 101 be redirected and dissipated in a non-destructive manner.

Figure 4C:
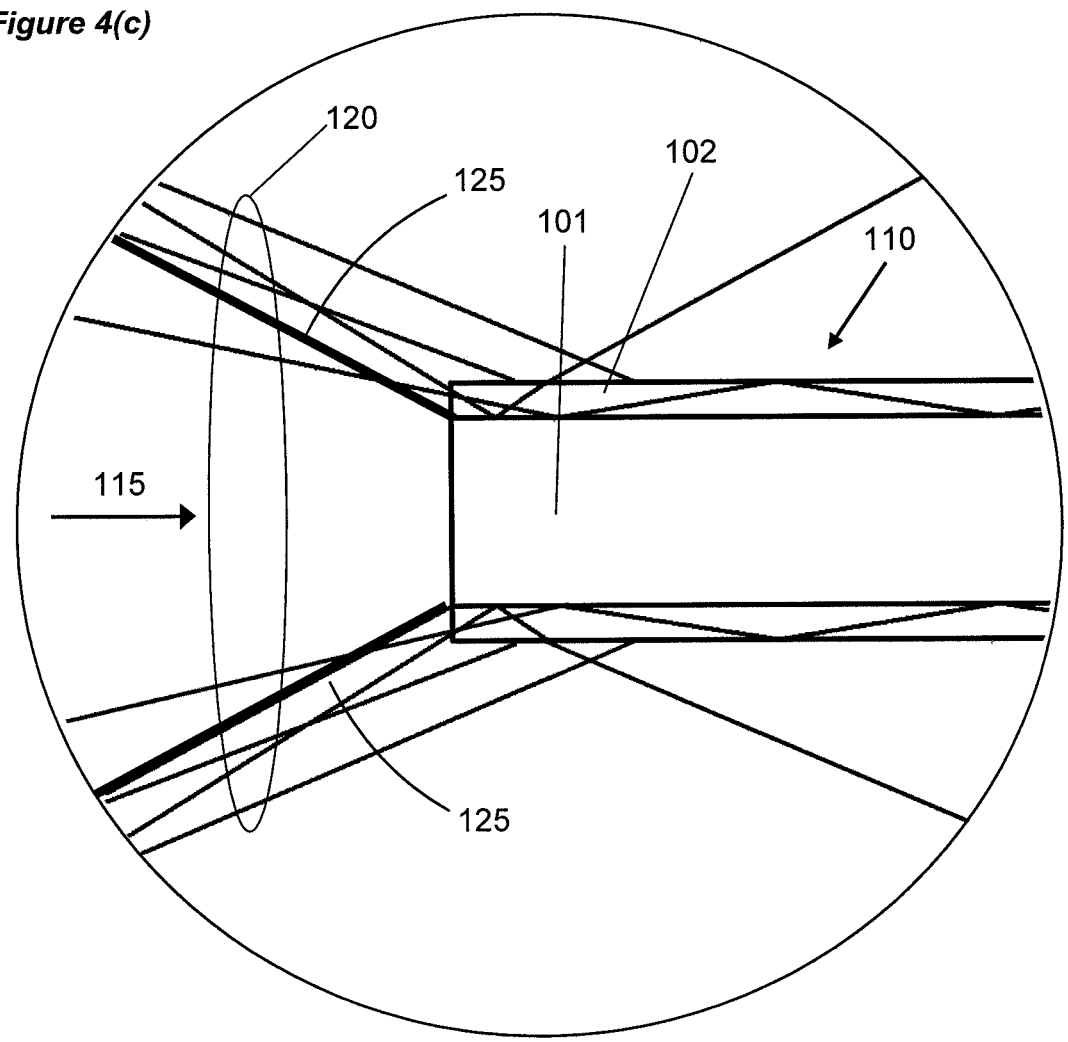
FIG. 4(c) is a diagram schematically illustrating a detail cross sectional view of an exemplary geometry of a single optical fiber without a buffer, such as that shown in FIG. 2(e), along with optical energy converging on and beyond the core.

One aspect of this inventive subject matter reduces the unwanted impingement of the unmatched portion of the light 115 directly into the buffer 103 by keeping the start of buffer 103 away from the entrance to the optical fiber 110 (e.g., FIGS. 4(a), 4(b) and 4(c) illustrate an optical fiber 110 without a buffer near the entrance to the fiber). As illustrated, FIG. 4(a) represents an ideal situation wherein all of the beams 120 directed at the entrance to the optical fiber 110 fall within the acceptance cone 125 of the fiber 110 and no portions of the beams 120 are directed into the cladding 102.

FIGS. 4(b) and 4(c) illustrate an exemplary embodiment of a real-world optical fiber 110 arrangement wherein a portion of the light 115 is not focused within the acceptance cone 125 of the core 101. Without a buffer present at the entrance, the portion of the light that is outside of the acceptance cone 125 cannot impinge directly on the buffer and therefore cannot cause immediate damage to the buffer or directly enter the buffer and therefore buffer cannot, at this point, become a direct conduit for such excess optical energy, therefore reducing the damage caused by such energy impinging farther along the length of the fiber.

Figure 5A:
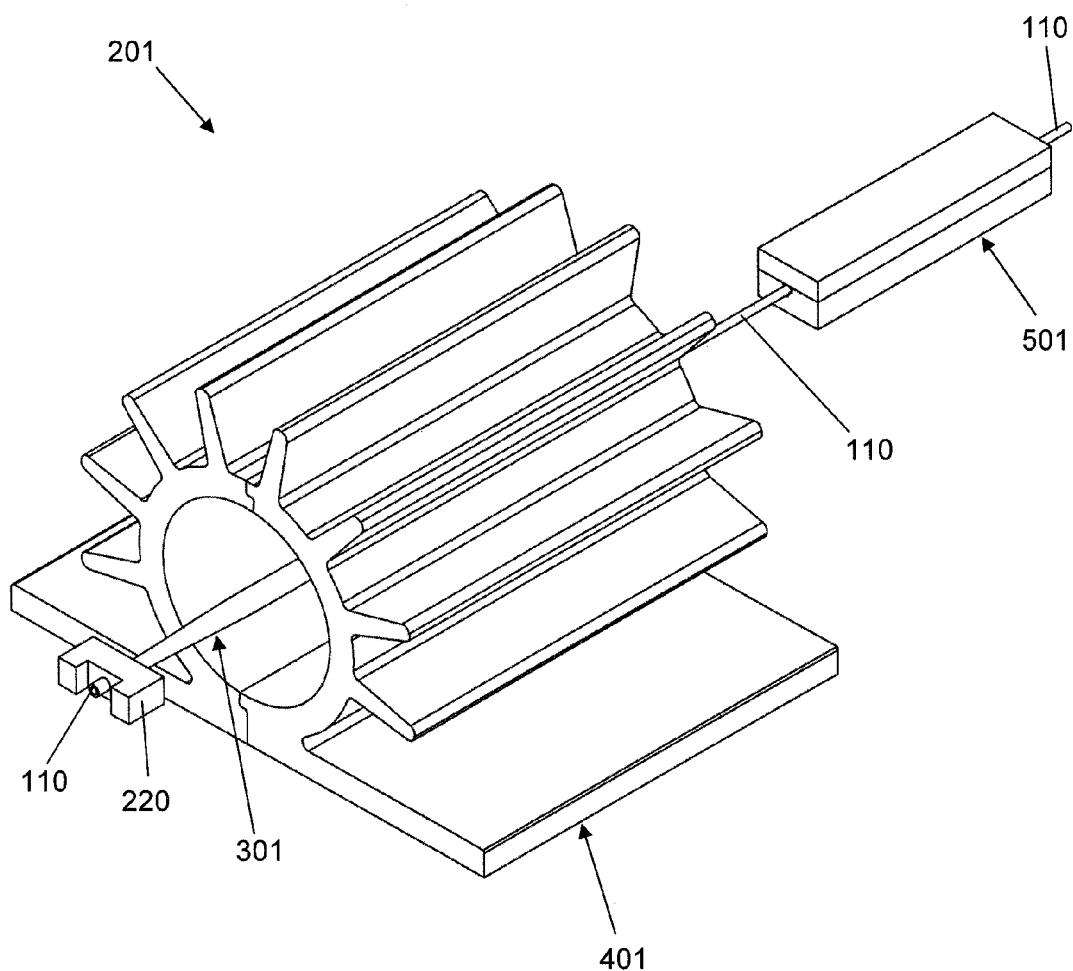
FIG. 5(a) is a diagram schematically illustrating a perspective view of an exemplary embodiment of an assembly comprising a plurality of optical energy dissipative elements.
Figure 5B:
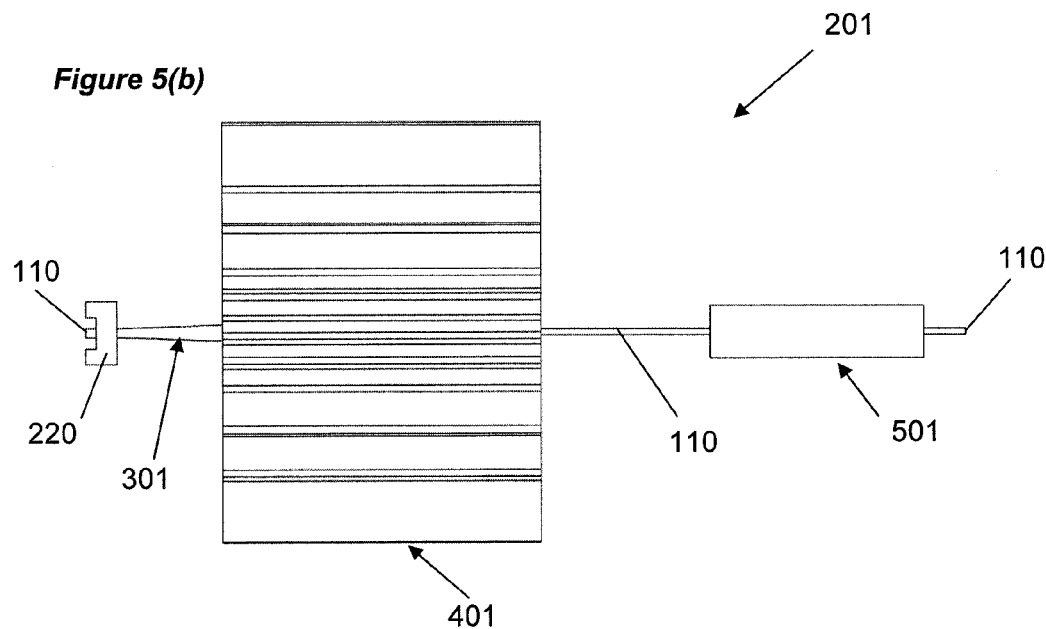
FIG. 5(b) is a diagram schematically illustrating a top view of an exemplary embodiment of an assembly comprising a plurality of optical energy dissipative elements.
Figure 5C:
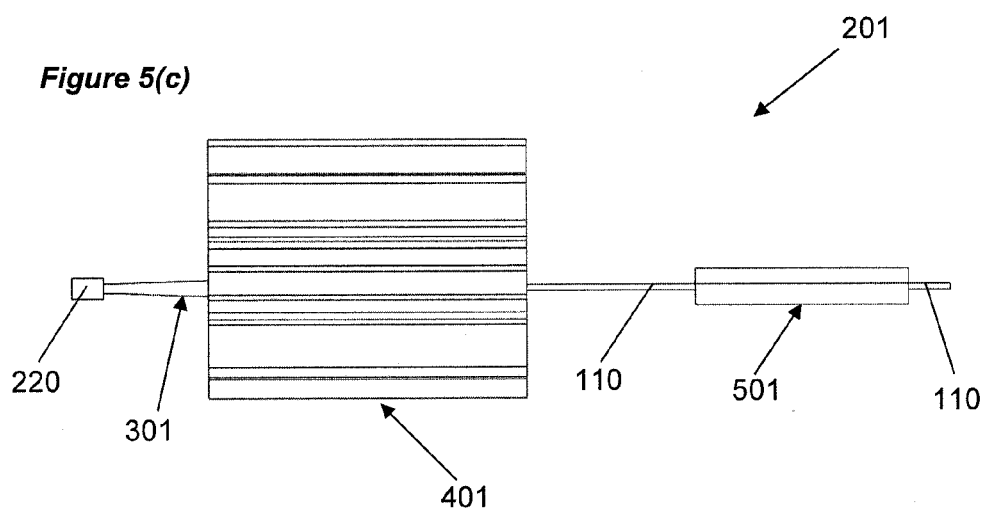
FIG. 5(c) is a diagram schematically illustrating a side view of an exemplary embodiment of an assembly comprising a plurality of optical energy dissipative elements.
Figure 5D:
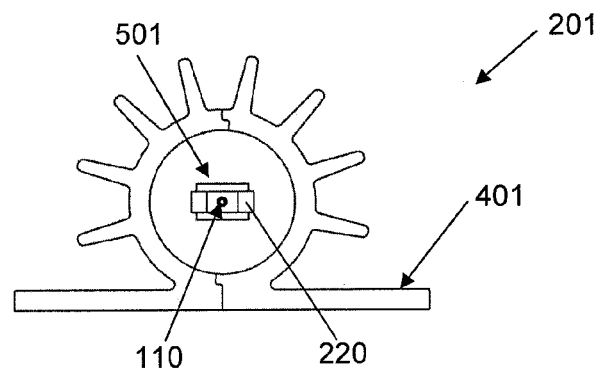
FIG. 5(d) is a diagram schematically illustrating an end view of an exemplary embodiment of an assembly comprising a plurality of optical energy dissipative elements.

An aspect of this inventive subject matter is illustrated in perspective view in FIG. 5(a) which depicts an exemplary embodiment of an optical energy dissipating assembly 201 comprising a plurality of stages having optical energy redirection, scattering and dissipation elements. An optical fiber 110 without a buffer at the entrance is held by a mounting block 220, which also holds, concentric to the optical fiber 110, an optical energy redirection and scattering apparatus 301 (e.g., a tapered glass sleeve). A thermal dissipation assembly 401 (e.g., a heat sink) is positioned in such a manner as to substantially surround the scattering region of the optical energy redirection and scattering assembly 301. Optical fiber 110 continues into and through a cladding mode stripper assembly 501. A top view of the optical energy dissipating assembly 201 is illustrated in FIG. 5(b). A side view of the optical energy dissipating assembly 201 is illustrated in FIG. 5(c). A front view of the optical energy dissipating assembly 201 is illustrated in FIG. 5(d).

Figure 6A:
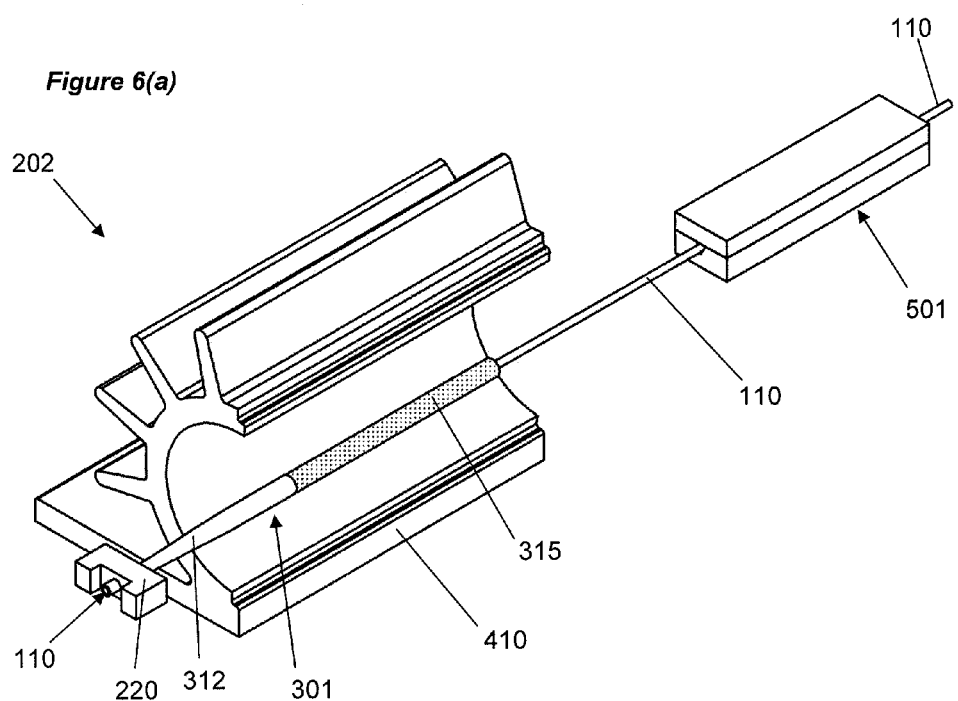
FIG. 6(a) is a diagram schematically illustrating a perspective view of an exemplary embodiment of an assembly comprising a plurality of optical energy dissipative elements with half of a heat sink assembly not shown.
Figure 6B:
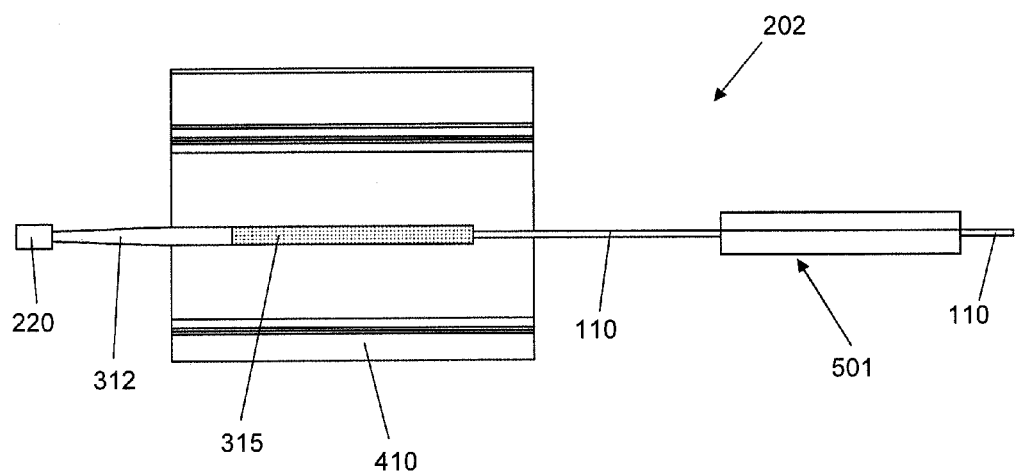
FIG. 6(b) is a diagram schematically illustrating a side view of an exemplary embodiment of an assembly comprising a plurality of optical energy dissipative elements with half of one heat sink assembly not shown.

A perspective view of a partially disassembled optical energy dissipating assembly 202 is depicted in FIG. 6(a) which is shown with only a portion 410 of thermal dissipation assembly 401. Shown in greater detail are aspects of an exemplary embodiment of an optical energy redirection and scattering apparatus 301 which comprises a glass tube having a tapered region 312 and a scattering region 315. A side view of the partially disassembled optical energy dissipating assembly 202 is illustrated in FIG. 6(b).

A perspective view of an exemplary embodiment of an optical energy redirection and scattering apparatus 301 along with mounting block 220 and optical fiber 110 is shown in FIG. 7(a). A detailed perspective view of the entrance end of the optical fiber 110, the mounting block 220 and aspects of the optical energy redirection and scattering apparatus 301 that is concentric to the optical fiber 110 and comprises an entrance surface 310 and tapered region 312 are shown in FIG. 7(b). FIG. 7(b) also illustrates front mounting surfaces 221 of the mounting block 221, which are typically adhesively attached to mounting structure orthogonal to the axis of the optical fiber 110. This mounting structure is typically made of a material that is transparent to the wavelength or wavelengths of the incident light.

Figure 7C:
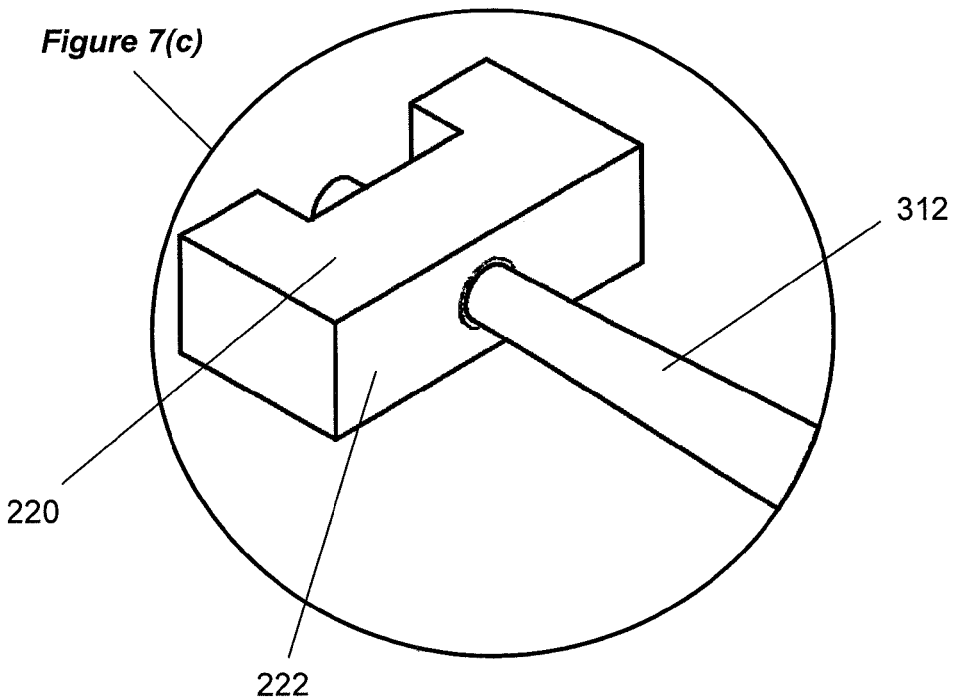
FIG. 7(c) is a diagram schematically illustrating a rear perspective view of the exemplary embodiment of the optical fiber energy scattering sub-assembly mounting block shown in FIG. 7(b)
Figure 7D:
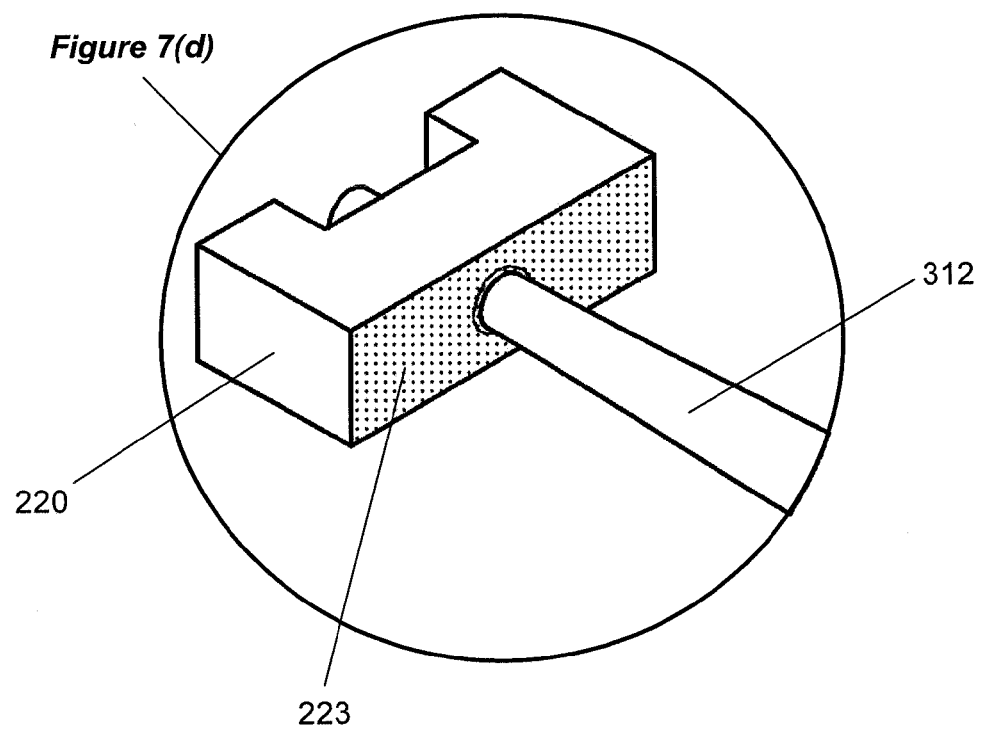
FIG. 7(d) is a diagram schematically illustrating a rear perspective view of the exemplary embodiment of the optical fiber energy scattering sub-assembly mounting block shown in FIG. 7(b) with a light-scattering rear surface.

It is an aspect of this inventive subject matter to substantially control where highly concentrated optical energy or coherent optical energy, particularly such energy as would be considered "stray", is dissipated and in an exemplary embodiment, structures in the path of such optical energy and proximal to that path are transparent to the optical energy or diffusive of the optical energy. The mounting block 220 is constructed of a material transparent to the incident light in order to reduce the heating of the mounting block. In an exemplary embodiment, the mounting block is made of General Electric GE 124 low OH quartz but may be constructed of other materials with high transparency at the wavelength range of the incident light. In another exemplary embodiment, in a system where materials, components, devices, other matter, assembly or assemblies may be damaged by stray optical energy passing through the mounting block 220, the normally transparent rear face 222 as shown in FIG. 7(c) may instead be a frosted rear face 223 as shown in FIG. 7(d) in order to scatter the optical energy that may pass through. Frosting of the rear face 223 is included in certain applications where it is needed to reduce the stray focused or coherent optical energy below the damage threshold of material onto which the remaining optical energy impinges.

Figure 8A:
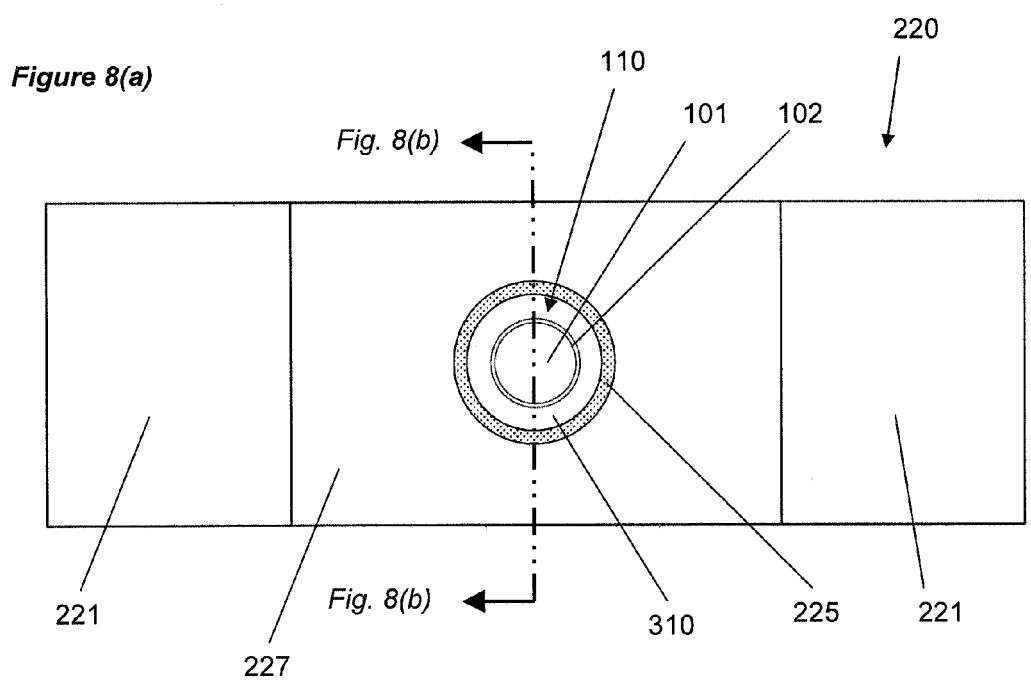
FIG. 8(a) is a diagram schematically illustrating a front view of the exemplary embodiment of an optical fiber energy scattering sub-assembly shown in FIG. 7(b) including a line indicating a cross-section view.
Figure 8B:
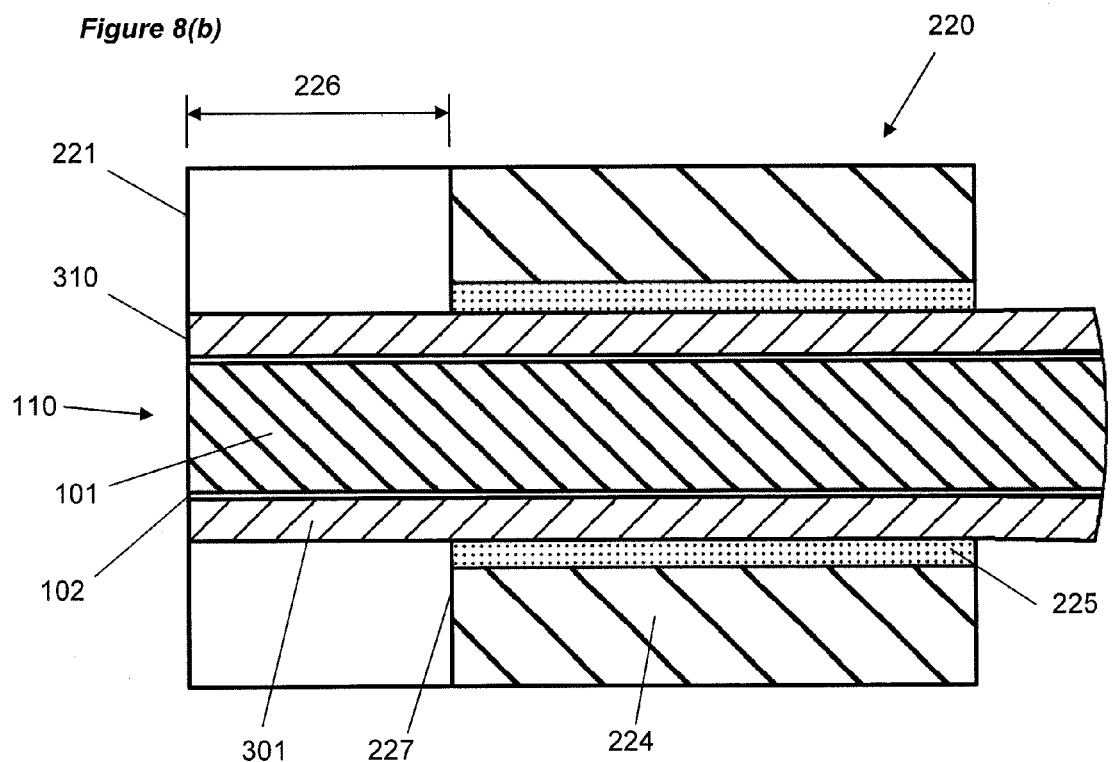
FIG. 8(b) is a diagram schematically illustrating a cross-section view of the exemplary embodiment of an optical fiber energy scattering sub-assembly shown in FIG. 8(a)

FIG. 8(a) shows an enlarged front view of the mounting block 220 depicted in FIG. 7, and FIG. 8(b) shows elements of FIG. 8(a) in a cross-section view, indicated by the cross-section line denoted "FIG. 8(b)" in FIG. 8 (a). Also shown is the entrance 310 of optical energy redirection and scattering apparatus 301, which forms a sleeve around the optical fiber 110 proximate to the entrance 310. Concentric with the entrance 310 is optical fiber 110, having cladding 101 and a core 102. The optical energy redirection and scattering apparatus 301 is attached to the mounting block 220 by an annular region of glass frit 225. A recessed surface 227 of the solid portion 224 of the mounting block 220 is set back from the entrance 310 by distance 226 in order to offset the mounting area from the primary focus of incoming optical energy, i.e., the core 101 of the optical fiber as seen previously in FIG. 4(c). In an exemplary embodiment, the setback distance 226 is approximately ~2 mm but may be a different distance in other embodiments. In an aspect of this inventive subject matter, the entrance 310 helps collect stray light that does not fall within the acceptance cone of the optical fiber 110.

Figure 9A:
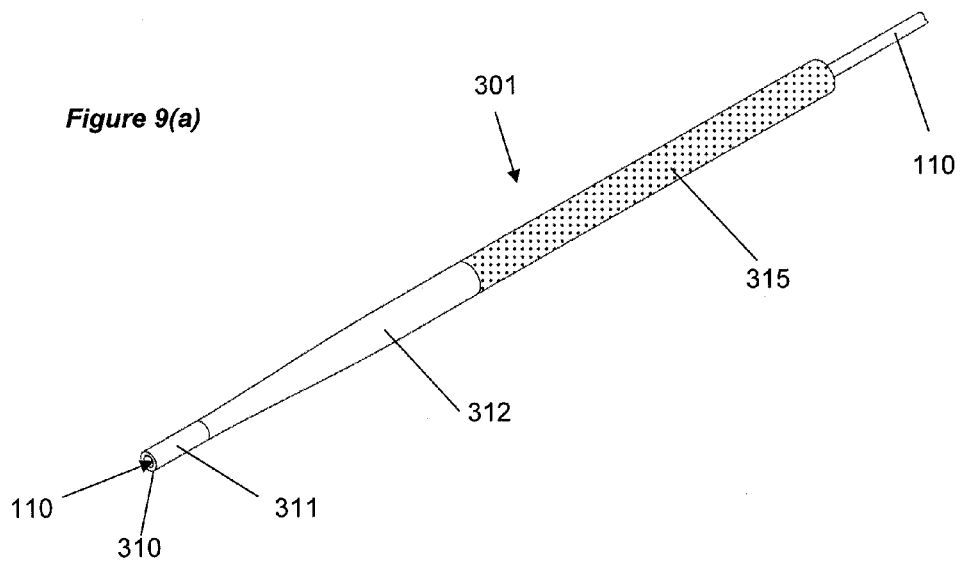
FIG. 9(a) is a diagram schematically illustrating a perspective view of the exemplary embodiment of the optical fiber energy scattering sub-assembly shown in FIG. 7(a) without a mounting block.
Figure 9B:
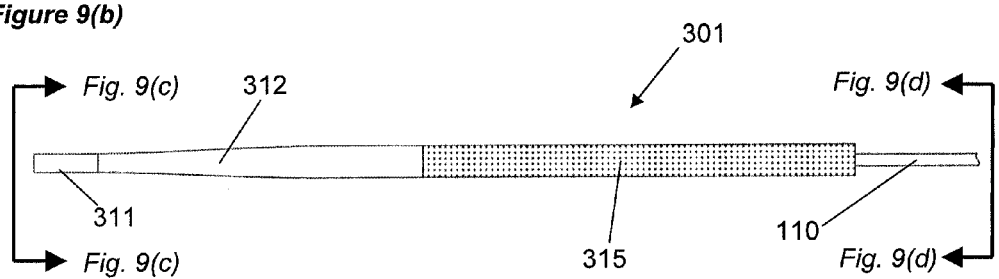
FIG. 9(b) is a diagram schematically illustrating a side view of the exemplary embodiment of the optical fiber energy scattering sub-assembly shown in FIG. 9(a) including a cross-section view line.

FIG. 9(a) shows a perspective view of an exemplary embodiment of an optical energy redirection and scattering apparatus 301 which comprises a tapered glass tube whose narrow end 311 is fused to the cladding 102 of the optical fiber 110 near the entrance of the optical fiber 110. In an exemplary embodiment, the glass tube is made from Synthetic Fused Silica Suprasil 300. FIG. 9(b) shows a side view of optical energy redirection and scattering apparatus 301 having optical fiber 110 partially shown exiting the optical energy redirection and scattering apparatus 301.

Figure 9G:
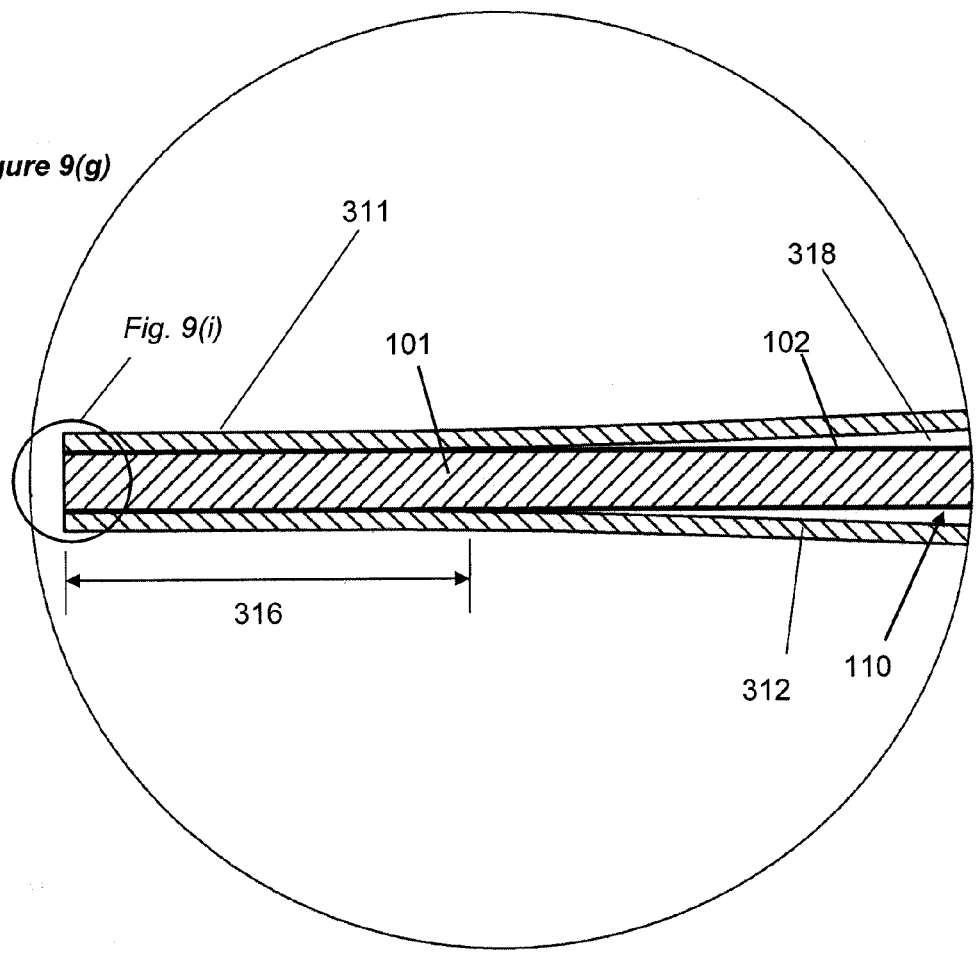
FIG. 9(g) is a diagram schematically illustrating an enlarged cross-section view of the exemplary embodiment of the front portion of an optical fiber energy scattering sub-assembly shown in FIG. 9(f)
Figure 9H:
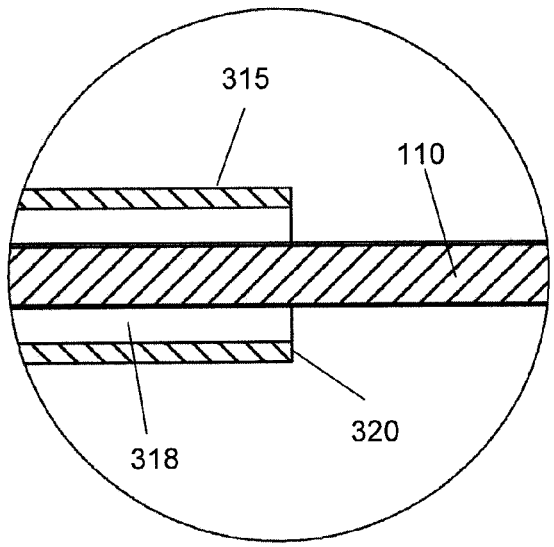
FIG. 9(h) is a diagram schematically illustrating an enlarged cross-section view of the end portion of the exemplary embodiment of an optical fiber energy scattering sub-assembly shown in FIG. 9(f)
Figure 9I:
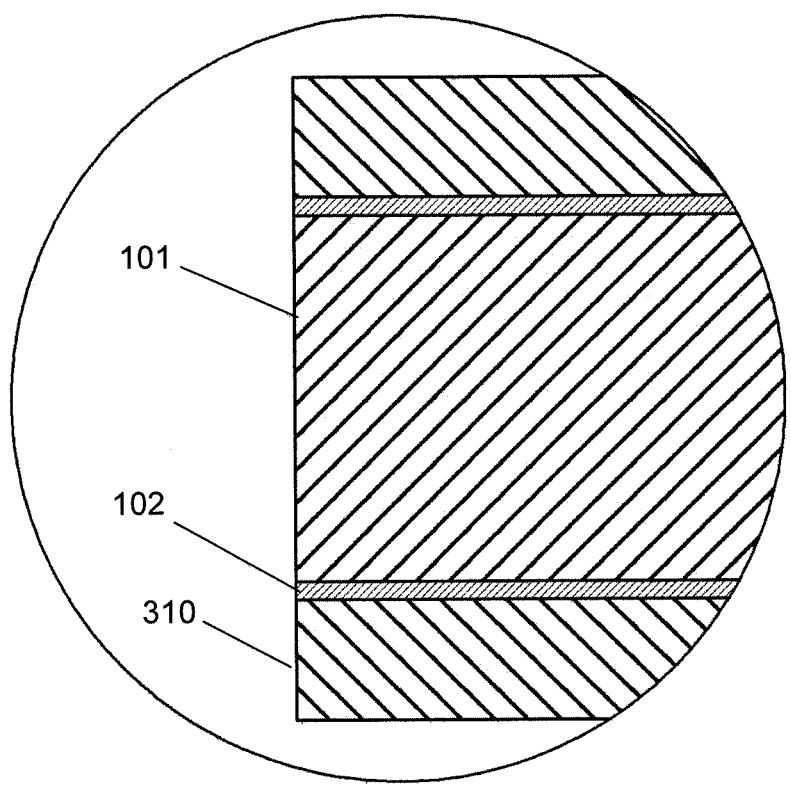
FIG. 9(i) is a diagram schematically illustrating an enlarged cross-section view of the exemplary embodiment of the entrance portion of an optical fiber energy scattering sub-assembly shown in FIG. 9(g)

FIG. 9(c) shows an enlarged end view of optical energy redirection and scattering apparatus 301 at the entrance surface 310 along with the tapered region 312. FIG. 9(d) shows an enlarged end view of the optical energy redirection and scattering apparatus 301 at the exit surface 320, which is annularly separated by an air space 318 from the cladding 102 of the fiber 110. FIG. 9(e) shows an end view at the entrance surface 310 of optical energy redirection and scattering apparatus 301. FIG. 9(f) shows optical energy redirection and scattering apparatus 301 in a cross-section view, as indicated by the cross-section line denoted "FIG. 9(f)" in FIG. 9(e). FIG. 9(g) shows an enlarged portion of the cross-section view shown in FIG. 9(f) including the fused region 311. FIG. 9(h) shows an enlarged portion of the cross-section view shown in FIG. 9(f) including the terminus 320. FIG. 9(i) shows a greatly enlarged cross-section view of the entrance end of the optical energy redirection and scattering apparatus 301.

In an exemplary embodiment shown in FIG. 9(g), the cladding 102 of an optical fiber is fused for a length 316 to the optical energy redirection and scattering apparatus 301 at the narrow end 311 of the optical energy redirection and scattering apparatus 301. The fused length 316 allows energy that is trapped in the cladding to migrate out of the cladding into the optical energy redirection and scattering apparatus 301 based on similarity between the index of refraction for the cladding 102 and the index of refraction of the material chosen for the optical energy redirection and scattering apparatus 301. The fused length 316 is determined by how much optical energy remains in the cladding 102. If the fused length is too short, then enough energy may remain in the cladding 102 to cause damage farther down the length of the optical fiber 110; if the fused length 316 is too long, the optical energy in the optical energy redirection and scattering apparatus 301 may find a return path into the cladding and enough energy will transfer back into the cladding 102 to cause damage farther down the length of the optical fiber 110. If the fused length 316 is optimum, the optical energy remaining in the cladding 102 of the optical fiber 110 past the fused length 316 will be at a minimum. In an exemplary embodiment, the fused length 316 is ~3 mm using Photonic Crystal Fiber (PCF) having a cladding diameter of 530 um. However, it will be appreciated that the fused length 316 will vary depending upon type and diameter of fiber used, the refractive index of the glass used in the optical energy redirection and scattering apparatus 301 and other factors implicit in the construction, and the determination of how long the fused length 316 can be made through an optical ray trace simulation or through other methods (e.g., iterative adjustments based on trial and error).

As shown in FIG. 9(g), a tapered region 312 begins after the fused region 316 ends and directs the optical energy away from the cladding 102, isolating it by an air space 318. The length of the tapered region 312 is an important consideration for optimum coupling of the non-fiber-coupled light away from the fiber and into the taper. In an exemplary embodiment, the length of the tapered region 312 is ~6 mm as determined using an optical raytrace simulation program called Zemax. In other embodiments using other fiber, other glass tubing dimensions or material to form the optical energy redirection and scattering apparatus 301, the length of the tapered region 312 may vary from the above mentioned exemplary embodiment.

In an aspect of the present inventive subject matter, the optical energy passes from the cladding 102 of the optical fiber 110 through the fused region 316 and along the tapered region 312 of the optical energy redirection and scattering apparatus 301 and into the scattering region 315. The scattering region 315 is a frosted portion of the glass tube corresponding to the optical energy redirection and scattering apparatus 301. In the scattering region 315, the optical energy is scattered widely in a diffuse manner in order to prevent or minimize the impingement of concentrated optical energy on other portions, sections, parts or components of the assembly or other material which may be damaged by non-diffuse optical energy. In an exemplary embodiment, the length of the scattering region 315 is ~2 cm.

An exemplary method by which the optical energy redirection and scattering apparatus 301 is formed is:
  a capillary or other suitable glass tube is cut to sufficient length to incorporate the above described features (or a tube of the requisite length is obtained);
  the tube is etched to frost the glass so as to create the scattering region 315;
  the tube is collapsed and fused onto the fiber using controlled heating; and
  the entrance surface 310 of the energy redirection and scattering apparatus 301 and the entrance surface of the optical fiber 110 are then polished.

Embodiments of the invention may further comprise placing the optical energy redirection and scattering apparatus 301 with glass frit 225 into a mounting block 220 and sintering them into place.

In an exemplary embodiment, the glass capillary tube is Synthetic Fused Silica Suprasil 300 having an internal diameter of 750 um and an outside diameter of 1100 um. In an exemplary embodiment of another aspect of the present inventive subject matter, the above mentioned capillary tube is frosted by using an etchant comprising HF+NH4F in a supersaturated solution at 35° C. It will be appreciated that other embodiments may use a lower temperature or different etchants or mechanical means to create the desired frosted surface such as sandblasting.

Figure 10A:
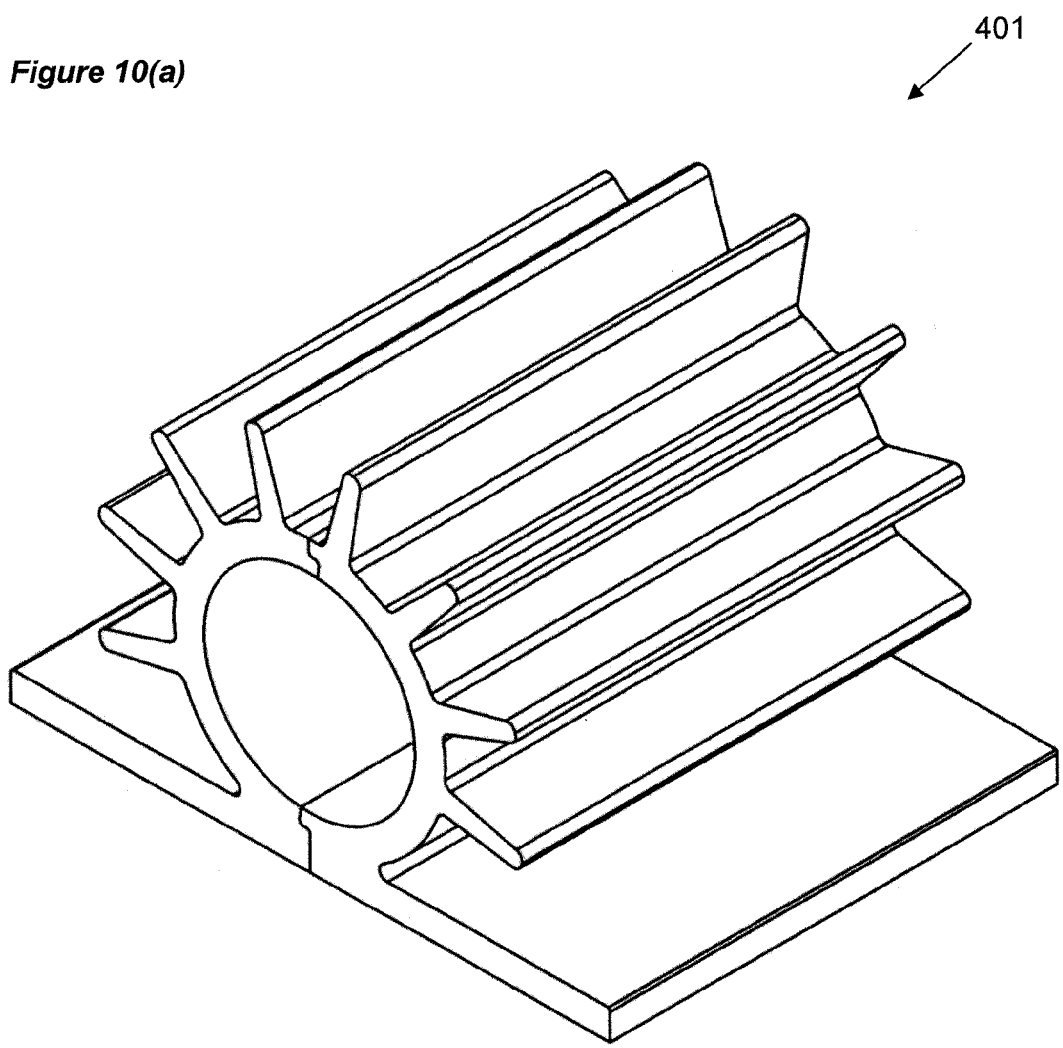
FIG. 10(a) is a diagram schematically illustrating a perspective view of an exemplary embodiment of a heat sink assembly.
Figure 10B:
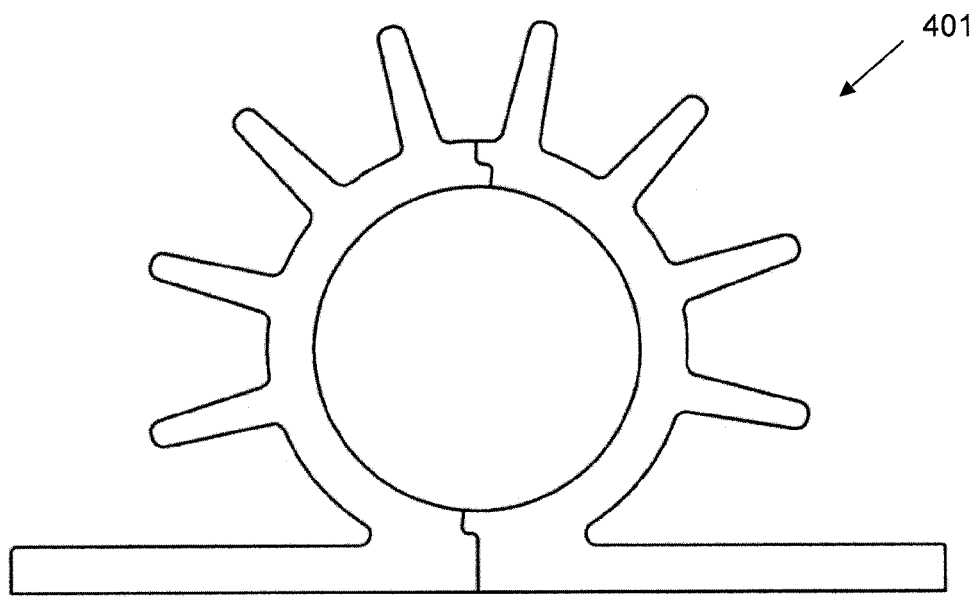
FIG. 10(b) is a diagram schematically illustrating an end view of an exemplary embodiment of the heat sink assembly shown in FIG. 10(a)
Figure 10C:
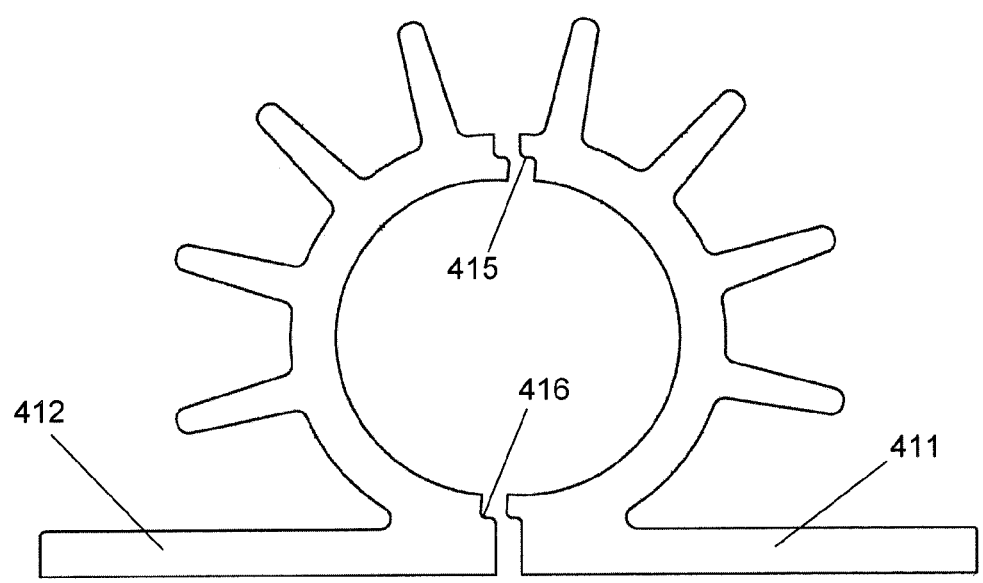
FIG. 10(c) is a diagram schematically illustrating an end view of an exemplary embodiment of components comprising the heat sink assembly shown in FIG. 10(a)

In an exemplary embodiment of an aspect of the present inventive subject matter, the optical energy that is scattered out from the scattering region 315 is absorbed by the heat sink assembly 401 shown in perspective view in FIG. 10(a) where such optical energy is benignly dissipated as heat. The heat sink assembly 401 of FIG. 10(a) is shown in a front view in FIG. 10(b) and in a partially disassembled front view in FIG. 10(c). In an exemplary embodiment, the heat sink assembly 401 is comprised of two individual heat sinks 411 and 412, each having overlapping joints 415 and 416 in order to prevent any of the optical energy radiated from the scattering region 315 from impinging on surfaces outside of the heat sink. In an exemplary embodiment, each heat sink 415 and 416 is extruded using 6063-T5 aluminum alloy.

In an exemplary embodiment of another aspect of the present inventive subject matter, such a heat sink is anodized black in order to maximize absorption (using an inorganic dye in order to maximize lifetime of the anodization). In another exemplary embodiment of an aspect of the present inventive subject matter, a surface intended to absorb optical energy is positioned at a distance from the source (in this context, the source is the scattering region 315), so as to have a radiative flux (i.e., energy per unit area) below that which will cause damage to the surface. This distance will depend upon the amount of optical energy being handled by the system. It will be appreciated that the distance may be determined through modeling, for example, by using a program such as SolidWorks.

Figure 11A:
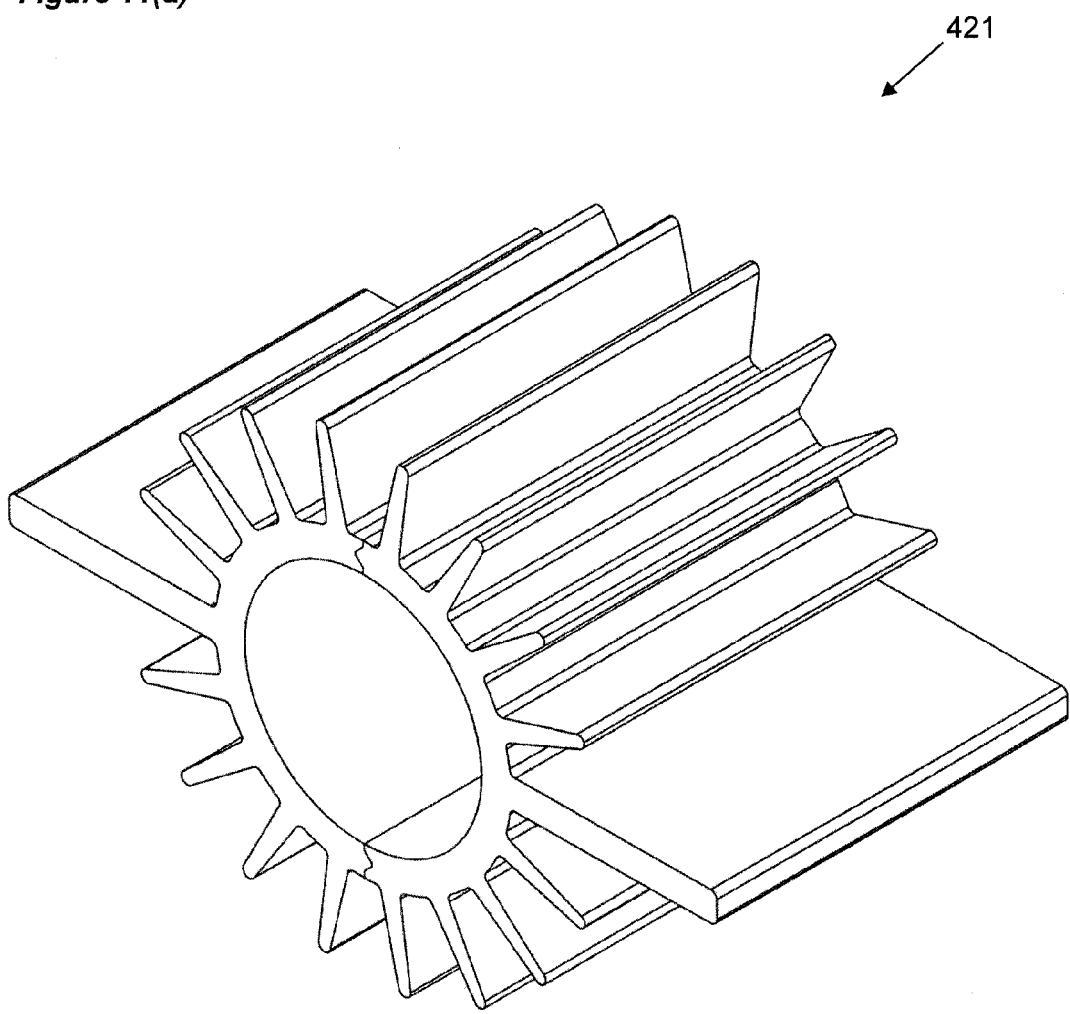
FIG. 11(a) is a diagram schematically illustrating a perspective view of an exemplary embodiment of a heat sink assembly.
Figure 11B:
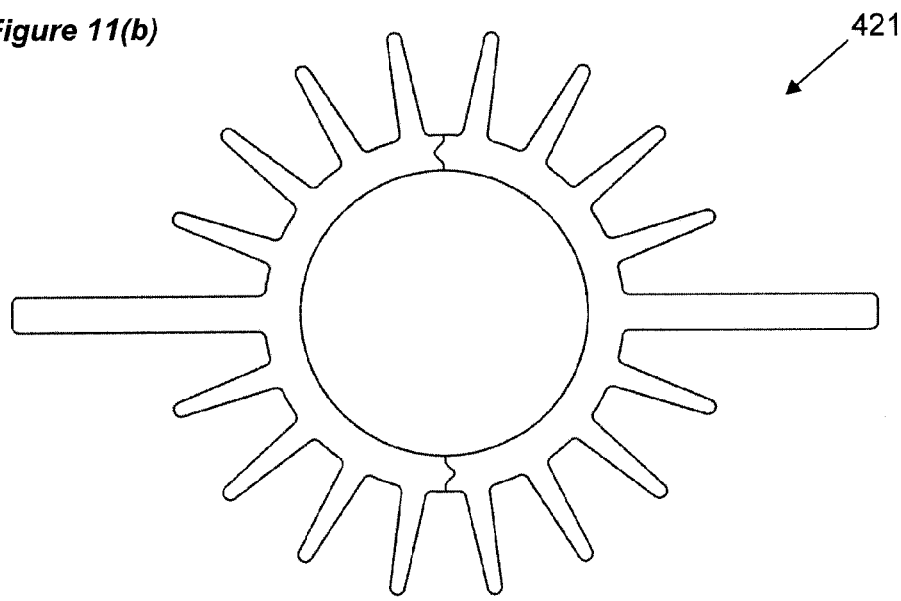
FIG. 11(b) is a diagram schematically illustrating an end view of an exemplary embodiment of the heat sink assembly shown in FIG. 11(a)
Figure 11C:
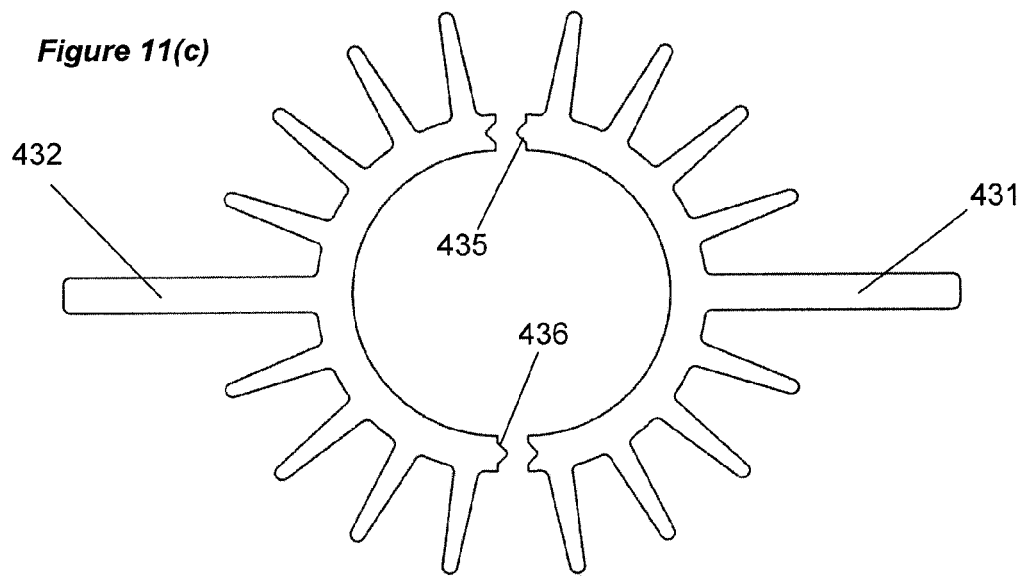
FIG. 11(c) is a diagram schematically illustrating an end view of an exemplary embodiment of components comprising the heat sink assembly shown in FIG. 11(a)

In an exemplary embodiment, the optical energy that is scattered out from the scattering region 315 is absorbed by the heat sink assembly shown in perspective view in FIG. 11(a) where such optical energy is benignly dissipated as heat. The heat sink assembly 421 of FIG. 11(a) is shown in a front view in FIG. 11(b) and in a partially disassembled front view in FIG. 11(c). In an exemplary embodiment, the heat sink assembly 421 is comprised of two individual heat sinks 431 and 432, each having overlapping joints 435 and 436 in order to prevent any of the optical energy radiated from the scattering region 315 from impinging on surfaces outside of the heat sink. In an exemplary embodiment of an aspect of the present inventive subject matter, two individual heat sinks 431 and 432 are designed to be symmetrical such that only one extrusion die would be needed to extrude both. In an exemplary embodiment, each heat sink 431 and 432 is extruded using 6063-T5 aluminum alloy. It is contemplated that other alloys could be used as well as other shapes and sizes of heat sinks.

In an alternative exemplary embodiment, an outer housing in which the optical energy dissipating assembly 201 is contained is constructed so as to also absorb the optical energy radiated from the scattering region 315. In this exemplary embodiment, there is no independent heat sink assembly such as shown in FIG. 10 or FIG. 11, instead, the housing itself forms the heat sink, radiating the heat generated by the absorbed optical energy to the outside world.

Figure 12A:
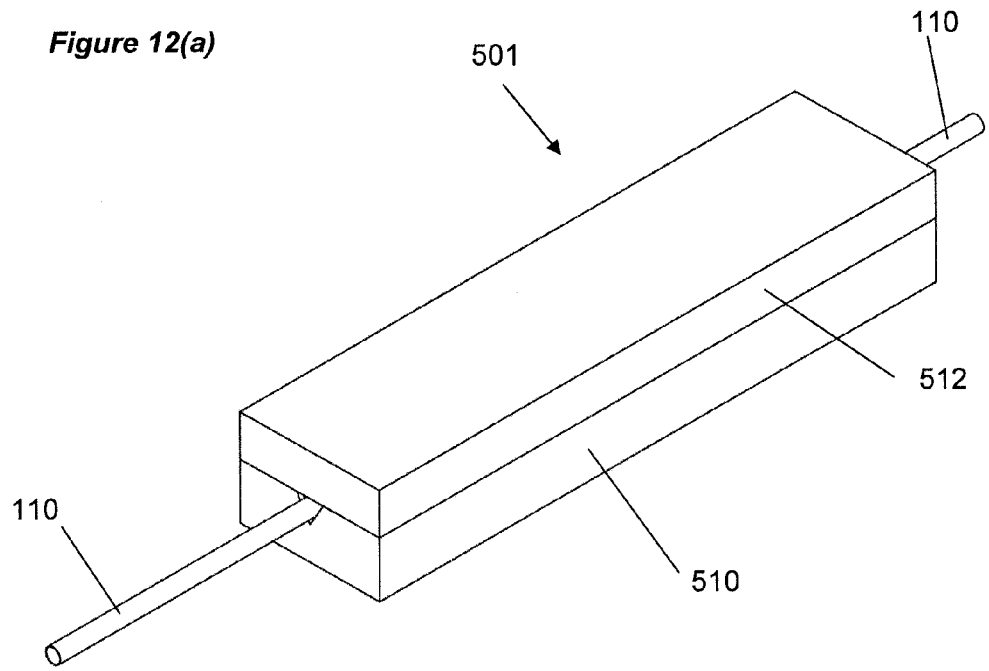
FIG. 12(a) is a diagram schematically illustrating a perspective view of an exemplary embodiment of an optical energy dissipating sub-assembly.

In an embodiment, at some point of the optical fiber 110 beyond the optical energy redirection and scattering apparatus 301, the optical fiber 110 may include a buffer. However, even in an example where about 80% of the excess energy in the cladding is benignly removed by the optical energy redirection and scattering apparatus 301 and mounting block assembly 220, the buffer may still potentially be damaged by the optical energy in the cladding 102. To avoid damage to the buffer, an exemplary embodiment includes a cladding mode stripper assembly 501 as shown in a perspective view in FIG. 12(a) to remove enough of the remaining optical energy from the cladding 102 to not cause damage to the buffer, which begins farther down the length of the optical fiber 110 past the cladding mode stripper assembly 501.

Figure 12B:
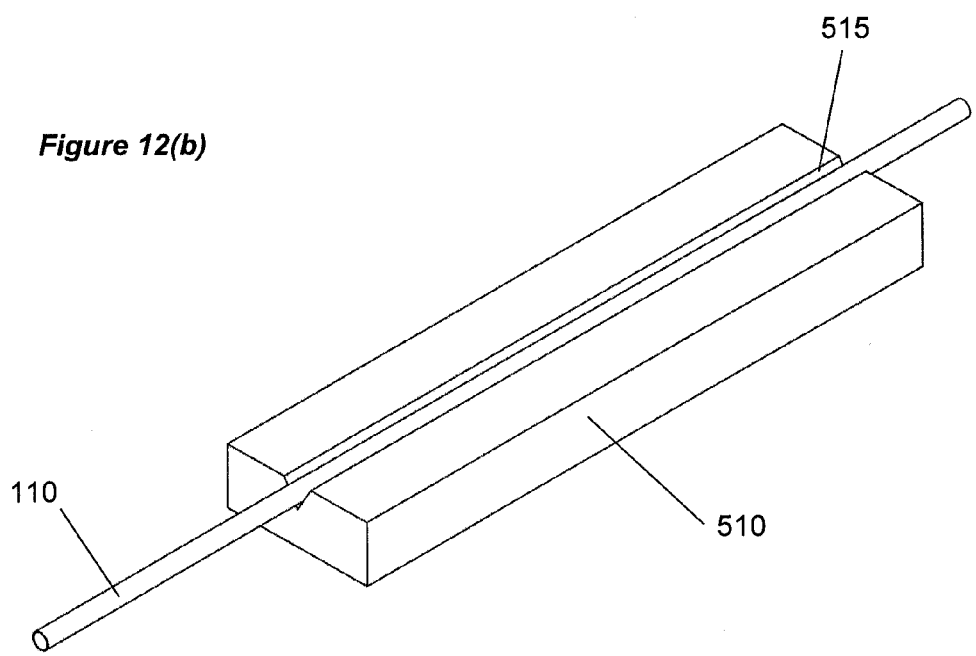
FIG. 12(b) is a diagram schematically illustrating a perspective view of an exemplary embodiment of the optical energy dissipating sub-assembly shown in FIG. 12(a), partially assembled.
Figure 12C:
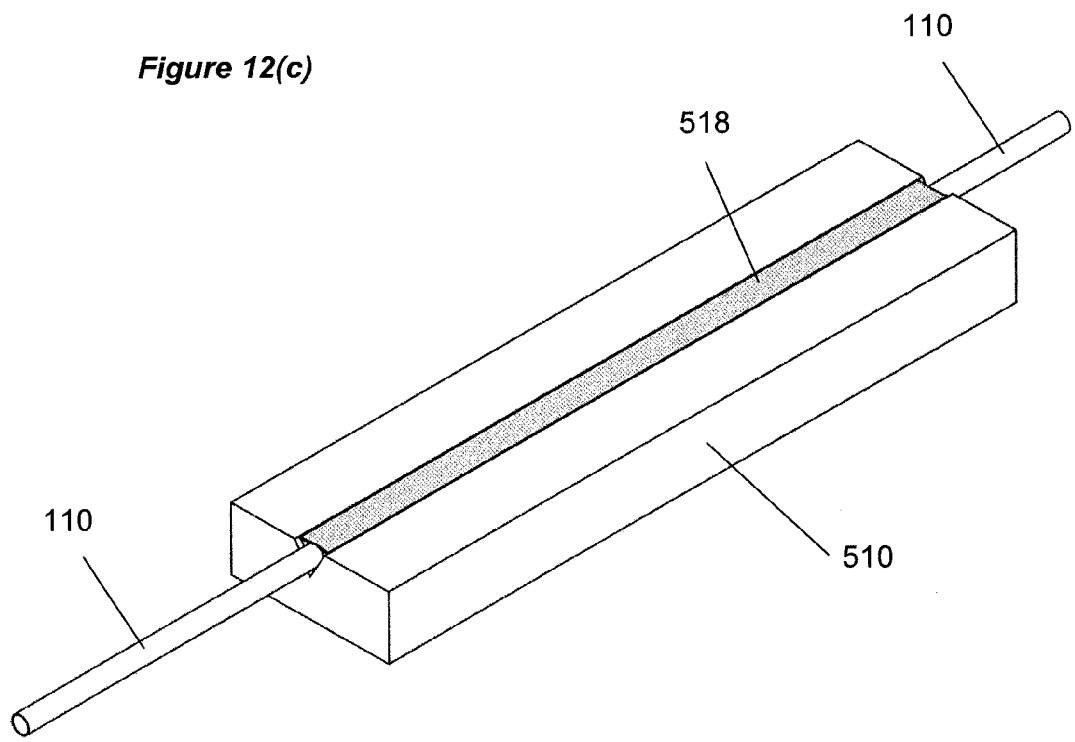
FIG. 12(c) is a diagram schematically illustrating a perspective view of an exemplary embodiment of the optical energy dissipating sub-assembly shown in FIG. 12(a), partially assembled.
Figure 12D:
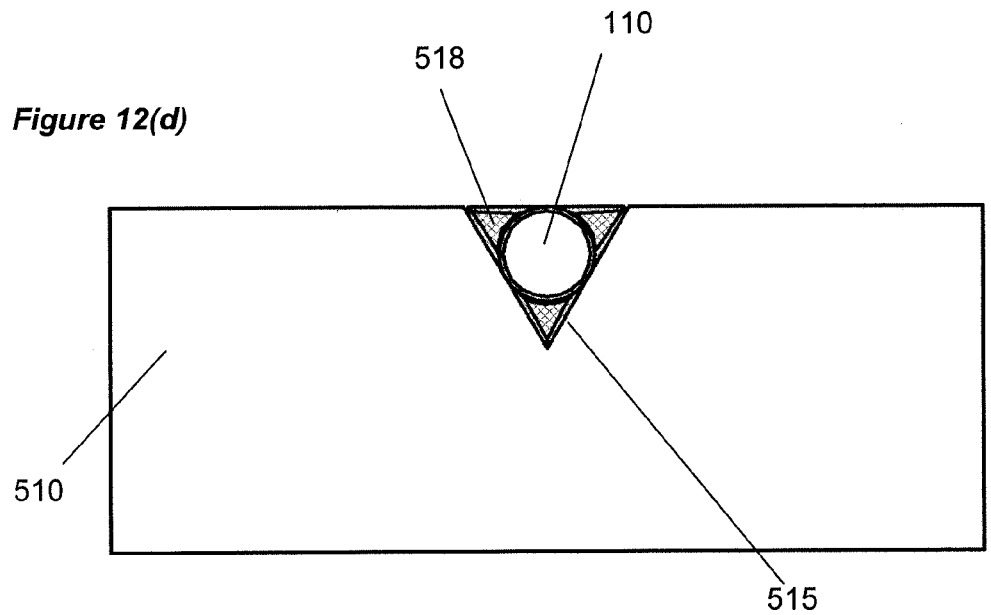
FIG. 12(d) is a diagram schematically illustrating an end view of an exemplary embodiment of the optical energy dissipating sub-assembly shown in FIG. 12(a), partially assembled.
Figure 12E:
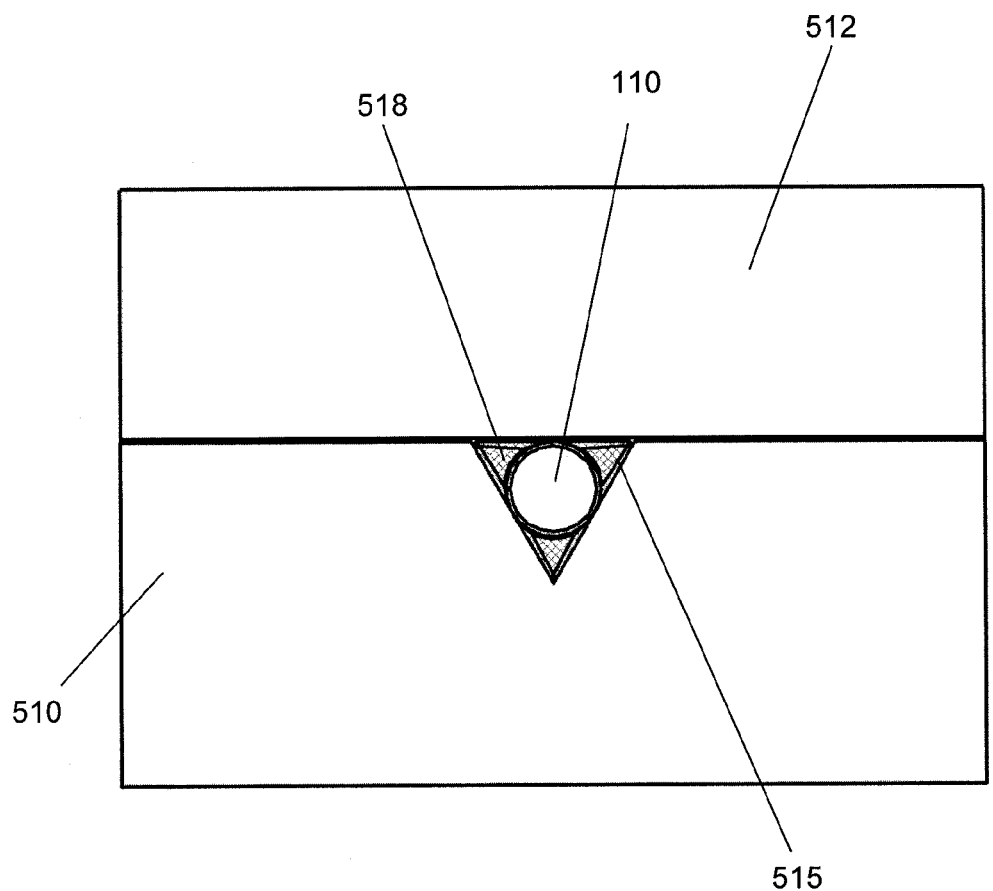
FIG. 12(e) is a diagram schematically illustrating an end view of an exemplary embodiment of the optical energy dissipating sub-assembly shown in FIG. 12(a), assembled.

The cladding mode stripper assembly 501, in an exemplary embodiment, comprises a base 510, a lid 512 and a "V"-shaped grove 515 cut into the base as shown in a perspective view in FIG. 12(b) with the lid 512 removed and a filler material 518 as shown in a perspective view in FIG. 12(c) and in an end view in FIG. 12(d). FIG. 12(e) shows an end view of the assembled cladding mode stripper assembly 501. In an exemplary environment, the filler material is high-index silicone.

In an exemplary embodiment, at the exit of a 1 cm long cladding mode stripper assembly 501, ~90% of the cladding mode optical energy has been removed. In another exemplary embodiment, at the exit of a 2 cm long cladding mode stripper assembly 501, ~99% of the cladding mode optical energy has been removed.

In one particular exemplary application, the type of optical energy being directed at the optical fiber is in the infrared (IR) range of 790 nm to 980 nm. Other applications for which the inventive concepts described herein are useful include other wavelength ranges as well, for example, wavelengths of around 420 nm and/or 1550 nm, as well as wavelengths in the range of 2 µm to 3 µm. It will be appreciated that the foregoing wavelengths and ranges of wavelengths are merely exemplary, and that the inventive concepts are not limited thereto It should be noted that, while the exemplary embodiments of the inventive subject matter discussed herein refer to optical fibers with nominally circular cross-sections, it is contemplated that an exemplary embodiment of the inventive subject matter herein may be applied to optical fibers with other cross-sectional shapes, including but not limited to rectangular, hexagonal and square. It is also contemplated that an exemplary embodiment of this inventive subject matter may be applied to optical fibers with cores having shapes other than round, including but not limited to rectangular, hexagonal and square. It is also contemplated that an exemplary embodiment of this inventive subject matter may be applied to optical fibers which have cores that are offset from the central axis of the optical fiber.

It will be appreciated that the inventive concepts are applicable to situations where an optical fiber is accepting light beams from light sources such as lasers (or an array of lasers) and/or where the light source is comprised of one or more optical fibers (e.g., fiber-to-fiber couplings), as well as other situations involving the transition of optical energy into an optical fiber.

Note that common mounting hardware such as screws, nuts, bolts and other such fasteners as would be familiar to those skilled in the art are not shown for the sake of clarity.

In view of the many possible embodiments to which the principles of this inventive subject matter may be applied, it should be recognized that the embodiments described herein with respect to the drawing figures is meant to be illustrative only and should not be taken as limiting the scope of the inventive subject matter. Those of ordinary skill in the art will recognize that the illustrated embodiments can be modified in arrangement and detail without departing from the spirit of the inventive subject matter. Therefore, the inventive subject matter as described herein contemplates all such embodiments as may come within the scope of the description above and equivalents thereof.

The invention claimed is:

1. A system, comprising:
   an optical fiber assembly, comprising an optical fiber and an optical energy redirection and scattering apparatus; and
   a light source, configured to focus and direct optical energy into the optical fiber of the optical fiber assembly through an air-to-fiber interface of the optical fiber;
   wherein the optical fiber comprises a core and a cladding and is configured to receive optical energy from the light source within a fiber acceptance angle of the optical fiber through the air-to-fiber interface of the optical fiber;
   wherein the optical energy redirection and scattering apparatus is configured to receive optical energy from the light source outside the fiber acceptance angle of the optical fiber, and the optical energy redirection and scattering apparatus comprises a narrow portion, a tapered portion, and a scattering portion;
   wherein the narrow portion is fused to the optical fiber proximate to an entrance of the optical fiber, and wherein the tapered portion and the scattering portion are separated from the optical fiber;
   wherein the scattering portion is configured to diffuse optical energy received in the optical energy redirection and scattering apparatus at a distance away from the optical fiber to avoid damage to the optical fiber by the optical energy from the light source outside the fiber acceptance angle of the optical fiber.

2. The system of claim 1, wherein the optical energy redirection and scattering apparatus is a transparent tube configured to transmit optical energy of the type received by the optical fiber through the tapered portion to the scattering portion.

3. The system of claim 1, wherein the optical fiber assembly further comprises:
   a mounting assembly to which the narrow portion of the optical energy redirection and scattering apparatus is attached.

4. The system of claim 3, wherein the mounting assembly comprises a mounting face by which the mounting assembly is configured to be affixed to a structure external to the optical fiber assembly.

5. The system of claim 4, wherein the mounting face includes a recessed region, wherein the optical fiber and the narrow portion of the optical energy redirection and scattering apparatus protrude from the recessed region.

6. The system of claim 3, wherein the mounting assembly is configured to be substantially transparent to optical energy of the type received by the optical fiber.

7. The system of claim 3, wherein the mounting assembly comprises a frosted rear face configured to scatter optical energy passing through the mounting assembly.

8. The system of claim 1, wherein the optical fiber further comprises a first length proximate to the entrance of the optical fiber without a buffer and a second length at a distance away from the entrance of the optical fiber with a buffer.

9. The system of claim 8, wherein the optical fiber assembly further comprises:

a cladding mode stripper assembly, configured to remove optical energy from the cladding of the optical fiber, positioned at a distance away from the entrance of the optical fiber past where the optical energy redirection and scattering apparatus ends and before where the second length of the optical fiber with the buffer begins.

10. The system of claim 1, wherein the light source further comprises one or more optical fibers or one or more lasers.

11. The system of claim 1, wherein the optical fiber assembly further comprises:
a heat sink assembly or a housing, configured to be concentric to the optical energy redirection and scattering apparatus and to absorb optical energy diffused by the scattering portion of the optical energy redirection and scattering apparatus.

12. The system of claim 1, wherein the cladding comprises an air cladding and an outer cladding.

13. A system, comprising:
an optical fiber assembly, comprising an optical fiber and a mounting assembly; and
a light source, configured to focus and direct optical energy into the optical fiber of the optical fiber assembly through an air-to-fiber interface of the optical fiber;
wherein the optical fiber comprises a core and a cladding and is configured to receive optical energy from the light source within a fiber acceptance angle of the optical fiber through the air-to-fiber interface of the optical fiber;
wherein the mounting assembly comprises a mounting face by which the mounting assembly is configured to be affixed to a structure external to the optical fiber assembly and is configured to avoid damage to the optical fiber by the optical energy from the light source outside the fiber acceptance angle of the optical fiber by being substantially transparent to the optical energy from the light source;
wherein the optical fiber assembly further comprises an optical energy redirection and scattering apparatus, the optical energy redirection and scattering apparatus further comprising a narrow portion, a tapered portion, and a scattering portion, wherein the narrow portion is fused to the optical fiber proximate to an entrance of the optical fiber, wherein the tapered portion and the scattering portion are separated from the optical fiber, wherein the scattering portion is configured to diffuse optical energy in the optical energy redirection and scattering apparatus, and wherein the optical fiber is attached to the mounting assembly via the narrow portion of the optical energy redirection and scattering apparatus.

14. The system of claim 13, wherein the mounting face includes a recessed region, wherein the optical fiber protrudes from the recessed region.

15. The system of claim 13, wherein the, mounting assembly comprises a frosted rear face configured to scatter optical energy passing through the mounting assembly.

16. The system of claim 13, wherein the optical fiber assembly further comprises:
a heat sink assembly or a housing, configured to be concentric to the optical energy redirection and scattering apparatus and to absorb optical energy diffused by the scattering portion of the optical energy redirection and scattering apparatus.

17. The system of claim 13, wherein the optical fiber further comprises a first length proximate to the entrance of the optical fiber without a buffer and a second length at a distance away from the entrance of the optical fiber with a buffer.

18. The system of claim 17, wherein the optical fiber assembly further comprises:
a cladding mode stripper assembly, configured to remove optical energy from the cladding of the optical fiber, positioned at a distance away from the entrance of the optical fiber past where the optical energy redirection and scattering apparatus ends and before where the second length of the optical fiber with the buffer begins.

19. A system, comprising:
an optical fiber assembly, comprising an optical fiber, an optical energy redirection and scattering apparatus, and a mounting assembly; and
a light source, configured to focus and direct optical energy into the optical fiber of the optical fiber assembly through an air-to-fiber interface of the optical fiber;
wherein the optical fiber comprises a core and a cladding and is configured to receive optical energy from the light source within a fiber acceptance angle of the optical fiber through the air-to-fiber interface of the optical fiber ;
wherein the optical energy redirection and scattering apparatus is configured to receive optical energy from the light source outside the fiber acceptance angle of the optical fiber, the optical energy redirection and scattering apparatus comprising a narrow portion, a tapered portion, and a scattering portion, wherein the narrow portion is fused to the optical fiber proximate to an entrance of the optical fiber, and wherein the tapered portion and the scattering portion are separated from the optical fiber, and wherein the scattering portion is configured to diffuse optical energy received in the optical energy redirection and scattering apparatus at a distance away from the optical fiber to avoid damage to the optical fiber;
wherein the mounting assembly is attached to the optical fiber and the mounting assembly comprises a mounting face by which the mounting assembly is configured to be affixed to a structure external to the optical fiber assembly and is configured to avoid damage from the optical energy outside the fiber acceptance angle of the optical fiber by being substantially transparent to the optical energy;
wherein the optical fiber further comprises a first length proximate to the entrance of the optical fiber without a buffer and a second length at a distance away from the entrance of the optical fiber with a buffer;
wherein the optical fiber assembly further comprises a cladding mode stripper assembly, configured to remove optical energy from the cladding of the optical fiber, positioned at a distance away from the entrance of the optical fiber past where the optical energy redirection and scattering apparatus ends and before where the second length of the optical fiber with the buffer begins.

* * * * *